US011453792B2

(12) United States Patent
Sugihara et al.

(10) Patent No.: US 11,453,792 B2
(45) Date of Patent: Sep. 27, 2022

(54) MAGENTA INK FOR INKJET

(71) Applicants: TOYO INK SC HOLDINGS CO., LTD., Tokyo (JP); TOYOCOLOR CO. LTD., Tokyo (JP)

(72) Inventors: Masahiro Sugihara, Tokyo (JP); Atsushi Yoda, Tokyo (JP); Yoshihito Suzuki, Tokyo (JP); Kazuhiro Jonai, Tokyo (JP)

(73) Assignees: TOYO INK SC HOLDINGS CO., LTD., Tokyo (JP); TOYOCOLOR CO., LTD, Tokyo (JP)

( * ) Notice: Subject to any disclaimer, the term of this patent is extended or adjusted under 35 U.S.C. 154(b) by 661 days.

(21) Appl. No.: 16/478,197

(22) PCT Filed: Dec. 22, 2017

(86) PCT No.: PCT/JP2017/046143
§ 371 (c)(1),
(2) Date: Jul. 16, 2019

(87) PCT Pub. No.: WO2018/135237
PCT Pub. Date: Jul. 26, 2018

(65) Prior Publication Data
US 2019/0330486 A1 Oct. 31, 2019

(30) Foreign Application Priority Data
Jan. 17, 2017 (JP) .............................. JP2017-005689

(51) Int. Cl.
| C09D 11/322 | (2014.01) |
| B41J 2/01 | (2006.01) |
| B41M 5/00 | (2006.01) |
| C08L 25/04 | (2006.01) |
| C08L 29/08 | (2006.01) |
| C08L 83/12 | (2006.01) |
| C09B 5/14 | (2006.01) |
| C09D 11/40 | (2014.01) |

(52) U.S. Cl.
CPC .............. *C09D 11/322* (2013.01); *B41J 2/01* (2013.01); *B41M 5/0047* (2013.01); *C08L 25/04* (2013.01); *C08L 29/08* (2013.01); *C08L 83/12* (2013.01); *C09B 5/14* (2013.01); *C09D 11/40* (2013.01)

(58) Field of Classification Search
CPC ..... C09D 11/326; C09D 11/322; C09D 11/38; C09D 11/107; C09D 11/40; C08L 29/08; C08L 83/12; C08L 25/04; C09B 5/14; B41M 5/0047; B41J 2/01
See application file for complete search history.

(56) References Cited

U.S. PATENT DOCUMENTS

| 7,135,208 | B2 | 11/2006 | Kubota |
| 9,732,240 | B2 | 8/2017 | Shigemori et al. |
| 10,294,381 | B2 * | 5/2019 | Chaffins ................. B41J 2/01 |
| 10,301,485 | B2 | 5/2019 | Mori |
| 10,995,227 | B2 * | 5/2021 | Suzuki ................. B41M 5/00 |
| 2005/0075449 | A1 | 4/2005 | Kubota |
| 2007/0282033 | A1 | 12/2007 | Ito et al. |
| 2017/0247556 | A1 | 8/2017 | Yokohama et al. |
| 2018/0187034 | A1 | 7/2018 | Takeno et al. |

FOREIGN PATENT DOCUMENTS

| JP | 2001-354888 A | 12/2001 |
| JP | 2004-210996 A | 7/2004 |
| JP | 2008-247941 A | 10/2008 |
| JP | 2010-222418 A | 10/2010 |
| JP | 2012-184334 A | 9/2012 |
| JP | 2012-188582 A | 10/2012 |
| JP | 2012-211260 A | 11/2012 |
| JP | 2013-107951 A | 6/2013 |
| JP | 2014-208777 A | 11/2014 |
| JP | 2014-214160 A | 11/2014 |
| JP | 2014-214277 A | 11/2014 |
| JP | 2014-224248 A | 12/2014 |
| JP | 2015-203094 A | 11/2015 |
| JP | 2016-056287 A | 4/2016 |
| JP | 2016-169295 A | 9/2016 |
| JP | 2016-175988 A | 10/2016 |
| JP | 2016-190995 A | 11/2016 |
| JP | 2016-222754 A | 12/2016 |
| JP | 2017-008319 A | 1/2017 |
| JP | 2017-061608 A | 3/2017 |
| JP | 2017-105971 A | 6/2017 |
| JP | 2017-155092 A | 9/2017 |
| JP | 2017-203098 A | 11/2017 |
| WO | 2014/156569 A1 | 10/2014 |
| WO | 2016/088901 A1 | 6/2016 |

OTHER PUBLICATIONS

Catalog of Surfynol series, 5 pages.
Catalog of Organic-modified silicone oil, 7 pages.
Japanese Notice of Reasons for Refusal issued in JP 2017-005689 dated Aug. 8, 2017.
Japanese Notice of Reasons for Refusal issued in JP 2018-027034 dated Apr. 16, 2018.
Opposition filed against corresponding JP Patent No. 6376505 (JP Application No. 2018-027034) dated Mar. 19, 2019.
International Search Report of PCT/JP2017/046143 dated Jan. 23, 2018.

(Continued)

*Primary Examiner* — An H Do
(74) *Attorney, Agent, or Firm* — Sughrue Mion, PLLC

(57) ABSTRACT

The invention provides a magenta ink for inkjet which yields distinct images having high gloss and no density irregularities or voids upon inkjet printing onto low-absorption substrates, exhibits excellent discharge stability after long standby periods, and can provide excellent drying properties even during high-speed printing; and also provides an ink set that can suppress mixed color bleeding and achieve superior color reproducibility.

13 Claims, No Drawings

(56) References Cited

OTHER PUBLICATIONS

Extended European Search Report dated Jan. 23, 2020 from European Patent Office in EP Application No. 17893427.9.
Notification of Reasons for Refusal dated Feb. 25, 2020, by JPO in the counterpart Japanese application No. 2018-111225.

* cited by examiner

MAGENTA INK FOR INKJET

CROSS REFERENCE TO RELATED APPLICATIONS

This application is a National Stage of International Application No. PCT/JP2017/046143 filed Dec. 22, 2017, claiming priority based on Japanese Patent Application No. 2017-005689 filed Jan. 17, 2017.

TECHNICAL FIELD

The present invention relates to a magenta ink for inkjet which yields distinct printed image quality having high gloss and few density irregularities or voids when printed onto low-permeation substrates by high-speed printing, exhibits excellent discharge stability after long standby periods, and can provide excellent drying properties on low-absorption substrates.

BACKGROUND ART

Because digital printing does not require a printing plate like conventional offset printing or gravure printing, reductions in production costs due to small-lot printing and reductions in the size of the printing devices can be achieved, resulting in digital printing being used in a wide variety of applications.

There are two digital printing technologies being used in the current market. One is called the electrophotographic method, and is a method in which printing is performed using a powder or liquid toner. This technology is widely used in color printers and office copiers and the like. The other digital printing technology is the inkjet method, and this technology is also used in all manner of applications, including in printers for consumers.

The inkjet method is a recording method in which ink droplets are discharged from extremely fine nozzles directly onto a recording member, with the ink being adhered to the recording member to obtain text or an image. This recording method not only has the advantages that the apparatus used generates little noise and is easy to operate, but also offers other advantages such as simple color generation, and is therefore an excellent printing technology.

Other characteristics of inkjet printing include the ability to use many types of inks such as aqueous inks, oil-based inks, solvent-based inks and ultraviolet-curable (UV) inks, and the ability to perform contactless printing to all manner of print media. Because printing can also be performed to substrates other than paper substrates, inkjet printing can be used not only in commercial printing applications, but also in industrial printing applications such as sign and display printing.

In industrial printing applications, printers that use solvent-based inks or UV inks and are capable of printing even to plastic substrates such as polyvinyl chloride sheets and PET films are now actually available. However, in recent years, for reasons including satisfying safety and environmental demands, the demand for aqueous inks is growing.

In terms of aqueous inks for inkjet printing, inks developed for use on plain paper or specialty papers such as glossy photographic papers such as those disclosed in Patent Documents 1 to 4 have long been known. On the other hand, in recent years, expectations have grown for an expansion in the potential applications for inkjet recording systems, and there are also growing needs for direct printing to low-absorption substrates such as art papers, coated papers and finely coated papers. However, with conventional aqueous inks, the liquid droplets are absorbed into the paper to create an image, and therefore if printing is performed onto a substrate having low water absorption, the image tends to blur, meaning such conventional inks cannot be used.

In the case of aqueous inks, the surface tension of water is particularly high, and therefore the ink is not only unlikely to penetrate into the type of substrates described above that exhibit little absorption (low-absorption substrates), but also has extremely poor wet spreadability. Accordingly, when an aqueous ink is printed onto a low-absorption substrate, voids caused by insufficient wet spreading of the ink on the substrate tend to occur more readily. Further, because the surface tension of the aqueous ink is high, the ink droplets tend to coalesce on the substrate upon impact, resulting in a deterioration in image quality such as density irregularities within the printed coating film.

On the other hand, in order to expand the potential applications for inkjet systems, superior color rendering reproducibility on substrates is also required, and in particular, the demands for superior color development for magenta inks and a wider color gamut continue to grow. The most widely known pigments used in magenta inks are quinacridone pigments and azo pigments, but quinacridone pigments have inferior tinting strength and the color reproduction range is also not entirely satisfactory. On the other hand, azo pigments have superior tinting strength and a broad color reproduction range, but have poor stability in organic solvents, and in some cases the pigment may dissolve, making it impossible to achieve the inherent color and gloss of the pigment on the substrate. Further, if an ink containing an azo pigment dissolved in an organic solvent is left in the inkjet head during a long standby period, then the pigment can sometimes precipitate due to a process in which the water volatilizes making the ink more concentrated, and this can cause problems such as nozzle blockages.

In order to address the above problems, the inventors of the present invention have previously proposed, in Patent Document 5, an ink that uses the azo pigment C.I. Pigment Red 150 and a basic organic compound. According to Patent Document 5, an inkjet ink can be obtained that has excellent red color reproducibility and excellent discharge stability with no problems such as ink blockages. However, the inks disclosed in the examples of Patent Document 5 have high surface tension, and the wettability of low-absorption substrates is unsatisfactory, and therefore issues such as the ink exhibiting inadequate coverage and causing voids or density irregularities remain a concern.

PRIOR ART DOCUMENTS

Patent Documents

Patent Document 1: JP 2004-210996 A
Patent Document 2: JP 2001-354888 A
Patent Document 3: JP 2008-247941 A
Patent Document 4: JP 2012-211260 A
Patent Document 5: JP 2014-214277 A

SUMMARY OF THE INVENTION

Problems to be Solved by the Invention

The present invention provides a magenta ink for inkjet which yields distinct images having high gloss and no density irregularities or voids upon inkjet printing onto low-absorption substrates, exhibits excellent discharge stability after long standby periods, and can provide excellent drying properties even during high-speed printing.

Further, the present invention also provides an ink set containing the above magenta ink for inkjet that can suppress mixed color bleeding and achieve superior color reproducibility on low-absorption substrates.

Means to Solve the Problems

As a result of intensive research aimed at addressing the above problems, the inventors of the present invention discovered that a magenta ink for inkjet containing an azo pigment, a water-soluble organic solvent (A-1) having specific static surface tension and HLB values and having at least one hydroxyl group, and a surfactant (B-1) having a specific HLB value, and an ink set containing this magenta ink for inkjet were able to resolve the problems outlined above, thus enabling the inventors to complete the present invention.

In other words, one embodiment of the present invention provides a magenta ink for inkjet containing at least a pigment, a water-soluble organic solvent (A), a surfactant (B) and water, wherein the pigment contains an azo pigment in an amount of 1 to 10% by weight relative to the total weight of the magenta ink for inkjet, the water-soluble organic solvent (A) contains a water-soluble organic solvent (A-1) having a static surface tension at 25° C. of 22 to 32 mN/m and an HLB value of 2.0 to 8.0 and having at least one hydroxyl group in an amount of 5 to 50% by weight relative to the total weight of the magenta ink for inkjet, and the surfactant (B) contains a surfactant (B-1) having an HLB value of 1.5 to 8.0.

In the above magenta ink for inkjet according to an embodiment of the present invention, the spectral reflectance of a coated product having a wet film thickness of 6 μm formed on a recording medium may be not more than 10% in the wavelength region from 480 to 580 nm.

In the above magenta ink for inkjet according to an embodiment of the present invention, the azo pigment may be at least one pigment selected from among C.I. Pigment Red 31, 146, 147, 150, 266 and 269.

In the above magenta ink for inkjet according to an embodiment of the present invention, the water-soluble organic solvent (A-1) may contain at least one compound having a boiling point at one atmosphere of 190 to 250° C.

In the above magenta ink for inkjet according to an embodiment of the present invention, the compound having a boiling point at one atmosphere of 190 to 250° C. may be an alkanediol of 4 to 6 carbon atoms.

In the above magenta ink for inkjet according to an embodiment of the present invention, the water-soluble organic solvent (A-1) may contain at least one glycol alkyl ether having a boiling point at one atmosphere of 100 to 250° C.

In the above magenta ink for inkjet according to an embodiment of the present invention, the dynamic surface tension at 10 milliseconds of the magenta ink for inkjet, calculated using the maximum bubble pressure method, may be from 25 to 35 mN/m.

The above magenta ink for inkjet according to an embodiment of the present invention may also contain, as a pigment dispersing resin, a (meth)acrylic-based copolymer having a weight average molecular weight of 15,000 to 50,000 that includes at least a monomer containing an aromatic ring within the copolymerization composition.

The above magenta ink for inkjet according to an embodiment of the present invention may contain at least one polyether-modified polydimethylsiloxane as the surfactant (B-1).

In the above magenta ink for inkjet according to an embodiment of the present invention, the polyether-modified polydimethylsiloxane may have a polyether group on a side chain of the polydimethylsiloxane chain.

Another embodiment of the present invention provides an inkjet ink set containing at least a cyan ink, a yellow ink and a magenta ink, wherein the cyan ink and the yellow ink contain at least one of the surfactant (B-1) described above, and the magenta ink is the magenta ink for inkjet described above.

Yet another embodiment of the present invention provides a method for producing an inkjet printed item, wherein the method includes printing the magenta ink for inkjet described above or the ink set described above onto a low-absorption substrate.

Effects of the Invention

The present invention is able to provide a magenta ink for inkjet which yields distinct images having high gloss and no density irregularities or voids upon inkjet printing onto low-absorption substrates, exhibits excellent discharge stability after long standby periods, and can provide excellent drying properties even during high-speed printing.

Further, the present invention is also able to provide an ink set containing the above magenta ink for inkjet that can suppress mixed color bleeding and achieve superior color reproducibility on low-absorption substrates.

EMBODIMENTS FOR CARRYING OUT THE INVENTION

The present invention is described below using a series of preferred embodiments. The embodiments described below merely represent examples of the embodiments of the present invention, and are not intended to limit the scope of the present invention.

In the present invention, by using an azo pigment, a water-soluble organic solvent (A-1) having specific static surface tension and HLB values and having at least one hydroxyl group, and a surfactant (B-1) having a specific HLB value, a magenta ink for inkjet (hereafter also referred to a simply "the ink") can be provided which yields distinct images having high gloss and no density irregularities or voids upon inkjet printing onto low-absorption substrates, exhibits excellent discharge stability after long standby periods, and can provide excellent drying properties even during high-speed printing.

As described above in relation to the prior art, aqueous inks generally exhibit poor wet spreadability on substrates due to the extremely high surface tension of the water contained in the ink as the main component. Further, it is also known that low-absorption substrates themselves have low surface tension, meaning the wet spreadability of inks is inferior to other substrates. When printing is performed on these types of low-absorption substrates using an inkjet head, if the wettability of the substrate is inadequate, such as in cases where the ink surface tension is high, then ink droplets that impact the substrate adjacently may coalesce before undergoing satisfactory spreading across the substrate, causing density irregularities. Further, voids caused by the ink not covering the substrate satisfactorily, and gloss defects caused by the dots not becoming smooth, but rather forming unevenness within the printed coating film, may also occur.

Further, because aqueous inks penetrate poorly into low-absorption substrates, printing trouble caused by ink drying problems also tend to occur frequently. In particular, in those cases where the ink wettability of the substrate is unsatisfactory, the contact surface area between the ink droplets and the substrate may also decrease, making the occurrence of drying problems more likely. As outlined above, in order to achieve superior printed image quality and drying properties on low-absorption substrates, improving the wetting properties of the ink is extremely important.

On the other hand, azo pigments exhibit superior color development and have excellent color reproducibility, but exhibit poor stability relative to organic solvents, and particularly highly hydrophobic organic solvents, and if an azo pigment is used in combination with a highly hydrophobic organic solvent for the purpose of improving the ink wetting properties, a problem arises in that the pigment tends to dissolve in the solvent, making it difficult to achieve the inherent color development properties and gloss of the pigment. Further, if the ink is left in the inkjet head during a long standby period, then the azo pigment dissolved in the highly hydrophobic water-soluble organic solvent can sometimes precipitate due to a process in which the ink becomes more concentrated, which can cause nozzle blockage problems that lead to discharge faults.

As described above, for conventional inks using azo pigments, the use of highly hydrophobic organic solvents has proven difficult, and has caused problems of poor printed image quality and drying properties on low-absorption substrates. As a result of intensive investigation of these issues, the inventors of the present invention discovered that the above problems could be addressed by using a combination of an azo pigment and a water-soluble organic solvent (A) containing a water-soluble organic solvent (A-1) having a static surface tension at 25° C. of 22 to 32 mN/m and an HLB value of 2.0 to 8.0 and having at least one hydroxyl group (hereafter also referred to a simply "the water-soluble organic solvent (A-1)"), and also using a surfactant (B) containing a surfactant (B-1) having an HLB value of 1.5 to 8.0 (hereafter also referred to a simply "the surfactant (B-1)"). The reasons why using the above composition enables a magenta ink for inkjet to be obtained which yields excellent printed image quality, including gloss and clarity, with no density irregularities or voids in the printed items, even when printing to low-absorption substrates, exhibits favorable drying properties even during high-speed printing, and exhibits excellent discharge stability after long standby periods are thought to include the following.

In the present invention, by using a water-soluble organic solvent having a static surface tension and an HLB value within specific ranges, the ink wettability of low-absorption substrates can be improved. However, simply using such an organic solvent cannot prevent the dissolution of the azo pigment mentioned above. Accordingly, in the present invention, this problem is resolved by ensuring that the water-soluble organic solvent is a compound having at least one hydroxyl group, and by also using a surfactant having a specific HLB value.

Although the detailed mechanism is not entirely clear, the azo pigment has an amide linkage and a hydroxyl group within the molecular structure, and it is thought that the azo pigment can therefore readily bind by hydrogen bonding to the water-soluble organic solvent having at least one hydroxyl group. On the other hand, the HLB value of the surfactant used in the present invention is similar to that of the water-soluble organic solvent. Generally, substances having similar HLB values tend to be more readily miscible, and therefore it is thought that the surfactant will exist in large amounts near the water-soluble organic solvent around the azo pigment. Accordingly, it is thought that the strongly hydrophobic surfactant exists around the periphery of the azo pigment, with the water-soluble organic solvent disposed therebetween, thereby preventing dissolution of the azo pigment.

On the other hand, as described above, because substances having similar HLB values tend to be more readily miscible, a portion of the surfactant of the present invention co-dissolves with the water-soluble organic solvent, so that when the ink liquid droplets strike the substrate, there is a possibility that not all of the surfactant will orient at the liquid droplet interface. Accordingly, it is thought that a portion of the added surfactant does not function as a surfactant, and in the present invention, because the ink wetting properties are ensured mainly by the presence of the water-soluble organic solvent, it is thought that the surfactant has little effect on the ink wetting properties. In contrast, if the total amount of the surfactant functioned as a surfactant, it is thought that the wettability would become too favorable, increasing the possibility of the ink droplets coalescing before drying.

As described above, it is thought that a water-soluble organic solvent and a surfactant having the parameters specified in the present invention contribute to achieving the objects of the present invention with a fine balance. In other words, it is thought that the ink of the present invention is able to achieve excellent printed image quality and drying properties even on low-absorption substrates, while maintaining the inherent color development properties and gloss of the pigment.

Each of the main components in the ink according to an embodiment of the present invention is described below.

<Pigment>

<Azo Pigment>

From the viewpoints of ensuring excellent clarity and gloss on the printed items, while maintaining a favorable balance between the amounts of the water-soluble organic solvent (A-1) and the surfactant (B-1), the amount of the azo pigment used as the pigment of the magenta ink for inkjet according to the present invention is preferably within a range from 1 to 10% by weight relative to the total weight of the ink. This amount is more preferably from 2 to 9% by weight, and particularly preferably from 3 to 8% by weight. In order to ensure that the spectral reflectance of an ink coated product described below falls within the preferred range, and that printed items having excellent discharge stability, color development, clarity and color reproducibility are obtained, the magenta ink for inkjet of the present invention may contain only one type of azo pigment, or may contain a combination of two or more azo pigments. Examples of azo pigments that can be used in the present invention include, but are not limited to, naphthol AS pigments, azo lake pigments, other monoazo pigments, and disazo pigments.

In the present invention, at least one pigment selected from among C.I. Pigment Red 31, 146, 147, 150, 266 and 269 is preferably used as the above azo pigment. All of these pigments are known as naphthol AS pigments, and compared with other azo pigments, because these pigments exhibit good stability relative to highly hydrophobic organic solvents, have an ether linkage and/or amino group within the structure, and are thought to exhibit powerful interactions with the water-soluble organic solvent (A-1), they enable the effects of the present invention to manifest particularly favorably. Further, regardless of the types and amounts of the water-soluble organic solvent (A-1) and the surfactant (B-1), the spectral reflectance in the wavelength region from 480 to 580 nm described below can be more easily adjusted to a value of 10% or less. Among the pigments listed above, in terms of the clarity of the images and achieving particularly superior color reproducibility when used within an ink set, the inclusion of at least C.I. Pigment Red 150 is particularly preferred. Further, in terms of obtaining high-gloss images having no density irregularities or voids in the printed items, the amount of the above naphthol AS pigment relative to the total weight of pigment is preferably within a range from 50 to 100% by weight, more preferably from 70 to 100% by weight, and particularly preferably from 90 to 100% by weight.

If the above naphthol AS pigment is described using C.I. Pigment Red 150 as an example, then the pigment can be obtained by a coupling reaction between 3-amino-4-methoxybenzanilide and 3-hydroxy-2-naphthamide, and it is known that commercially available C.I. Pigment Red 150 contains residual amounts of these raw materials (see Patent Document 5). Because these raw materials also contain an amino group or hydroxyl group, they are thought to also initiate the types of interactions with the water-soluble organic solvent (A-1) and the surfactant (B-1) described above. If the amounts of these raw materials included as impurities are large, then the amounts of the water-soluble organic solvent (A-1) and surfactant (B-1) that interact with the C.I. Pigment Red 150 will decrease, increasing the possibility of a deterioration in the balance in the blend of materials, and therefore in order to ensure satisfactory manifestation of the effects of the present invention, the amounts of these impurities are preferably reduced. In the case of the C.I. Pigment Red 150 example described above, the amounts of the 3-amino-4-methoxybenzanilide and 3-hydroxy-2-naphthamide relative to the total weight of the ink are each preferably not more than 8,000 ppm, more preferably not more than 6,000 ppm, even more preferably not more than 4,000 ppm, and particularly preferably 3,000 ppm or less. The amounts of these impurities can be measured, for example, using HPLC methods.

Further, in the present invention, azo lake pigments can also be used favorably as the azo pigment. In this description, an "azo lake pigment" describes a pigment in which a polyvalent metal ion having a powerful insolubilizing effect such as $Ca^{2+}$, $Ba^{2+}$, $Sr^{2+}$, $Mn^{2+}$ or $Al^{3+}$ is added to a water-soluble azo colorant to generate an insoluble pigment. Azo lake pigments have extremely high tinting strength, and can produce images having excellent image density, clarity and color reproducibility even when included in the ink in small amounts. Further, because the amount of pigment capable of causing discharge faults as a result of dissolution and precipitation can be suppressed, the discharge stability can also be improved.

In the present invention, any of the various conventionally known azo lake pigments may be used. Among these pigments, the use of β-oxynaphthoic acid-based lake pigments is preferred. The β-oxynaphthoic acid-based lake pigment used in the present invention is preferably at least one pigment selected from among C.I. Pigment Red 48:1, 48:2, 48:3, 52:1, 52:2, 57:1 and 57:2, and from the viewpoints of the clarity of the images and achieving particularly superior color reproducibility when used within an ink set, the inclusion of at least C.I. Pigment Red 48:3 is particularly preferred. Further, in terms of obtaining an ink having particularly superior storage stability and drying properties, the amount of the above β-oxynaphthoic acid-based lake pigment relative to the total weight of pigment is preferably within a range from 50 to 100% by weight, more preferably from 70 to 100% by weight, and particularly preferably from 90 to 100% by weight.

In addition, in the present invention, from the viewpoints of the discharge stability and the clarity and color reproducibility of the images, at least one monoazo pigment or disazo pigment selected from among C.I. Pigment Red 1, 166 and 242 can also be used favorably as the above azo pigment.

In one preferred embodiment, from the viewpoints of obtaining a magenta ink for inkjet having superior storage stability, drying properties and discharge stability, a combination of a naphthol AS pigment listed above and a β-oxynaphthoic acid-based lake pigment is preferably used. In such cases, the naphthol AS pigment preferably includes at least one pigment selected from among C.I. Pigment Red 146, 150 and 266, more preferably includes at least one pigment selected from among C.I. Pigment Red 146 and 150, and even more preferably includes C.I. Pigment Red 150.

<Other Pigments>

In order to ensure that the spectral reflectance of an ink coated product described below falls within the preferred range, and that the inkjet printed items can be imparted with characteristics including excellent color development and clarity, superior color reproducibility, and superior light resistance and water resistance and the like, the magenta ink for inkjet of the present invention may also contain, in addition to the azo pigment, one or more pigments other than the above azo pigment (hereafter also referred to as "other pigments"). Among these other pigments, in terms of obtaining printed items that also exhibit excellent light resistance and water resistance, and achieving superior discharge stability for the ink, this other pigment is preferably selected from among quinacridone pigments such as C.I. Pigment Red 122, 202, 209 and 282, and solid-solution pigments containing these quinacridone pigments. Among the quinacridone pigments listed above, in terms of achieving superior clarity and color reproducibility for printed items produced using an ink that also contains the azo pigment, the inclusion of at least C.I. Pigment Red 122 is particularly preferred.

In the present invention, when the azo pigment is used in combination with another pigment, from the viewpoints of ensuring that the spectral reflectance in the wavelength region from 480 to 580 nm described below is not more than 10%, achieving superior clarity and color reproducibility for the printed items, and obtaining an ink having superior discharge stability, the amount of the azo pigment relative to the total weight of pigment is preferably within a range from 50 to 100% by weight, and more preferably from 70 to 100% by weight.

<Water-Soluble Organic Solvent (A)>
<Water-Soluble Organic Solvent (A-1)>

The magenta ink for inkjet of the present invention contains, as the water-soluble organic solvent (A), a water-soluble organic solvent (A-1) having a static surface tension at 25° C. of 22 to 32 mN/m and an HLB value of 2.0 to 8.0 and having at least one hydroxyl group in an amount of 5 to 50% by weight relative to the total weight of the magenta ink for inkjet.

The static surface tension of the ink in the present invention refers to the surface tension measured in an environment at 25° C. using the Wilhelmy method (plate method, vertical plate method). The static surface tension of the water-soluble organic solvent (A-1) used in the present embodiment is preferably at least 22 mN/m but not more than 32 mN/m, and is more preferably at least 24 mN/m but not more than 30 mN/m.

The HLB value of the water-soluble organic solvent (A-1) used in the present invention is preferably within a range from 2.0 to 8.0. By ensuring that the HLB value falls within this range, the miscibility with the surfactant (B-1) is favorable, the clarity and gloss on low-absorption substrates is improved, and an ink having excellent discharge stability that does not suffer from nozzle blockages even after long standby periods can be obtained. From the viewpoints of ensuring even better miscibility, and ensuring excellent discharge stability, clarity and gloss, the HLB value of the water-soluble organic solvent (A-1) is more preferably from 3.0 to 8.0, and in terms of obtaining an ink having particularly superior clarity and gloss, an HLB value of 3.0 to 6.0 is particularly desirable.

The HLB (Hydrophile-Lipophile Balance) value is one parameter that indicates the hydrophilicity and hydrophobicity of a material, with a smaller HLB value indicating a material having high hydrophobicity, and a larger number indicating a material having high hydrophilicity. Examples of methods for calculating the HLB value include Griffin's method, Davies' method, and the Kawakami method. Further, a variety of actual measurement methods are also known, but in the present invention, in those cases where the structure of the compound is clear, such as in the case of the water-soluble organic solvent, the HLB value is calculated using Griffin's method. Griffin's method is a method of determining the HLB value using the molecular structure and molecular weight of the target material in accordance with the formula (1) shown below.

HLB value=20×(sum of molecular weights of hydrophilic portions)÷(molecular weight of the material)        Formula (1):

On the other hand, in the case of a compound for which the structure is unclear such as the surfactant described below, the HLB value of the surfactant can be determined experimentally, for example using the method disclosed on page 324 of "The Surfactant Handbook" (edited by Ichiro Nishi et al., Sangyo-Tosho Publishing Co. Ltd., 1960). Specifically, 0.5 g of the surfactant is first dissolved in 5 mL of ethanol, and with the resulting solution undergoing stirring at a temperature of 25° C., a titration is performed with a 2% by weight aqueous solution of phenol, with the point where cloudiness of the liquid occurs being deemed the end point. If the amount of the aqueous solution of phenol required to reach the end point is termed A (mL), then the HLB value can be calculated in accordance with the following formula (2).

HLB value=0.89×A+1.11        Formula (2):

From the viewpoints of ensuring superior gloss, clarity and drying properties on low-absorption substrates, and achieving a favorable balance with the amounts of the azo pigment and the surfactant (B-1), the amount of the water-soluble organic solvent (A-1) in the present invention relative to the total weight of the magenta ink for inkjet is preferably within a range from 5 to 50% by weight, more preferably from 10 to 45% by weight, and even more preferably from 15 to 40% by weight. An amount of 20 to 35% by weight is particularly desirable, and by using an amount within this range, the stability of the ink over time can also be improved.

Any type of solvent may be used as the water-soluble organic solvent (A-1) provided it is a water-soluble organic solvent having a static surface tension at 25° C. of 22 to 32 mN/m and an HLB value of 2.0 to 8.0 and having at least one hydroxyl group. Examples of water-soluble organic solvents (A-1) that can be used in the present invention include, but are not limited to, 3-methoxy-1-butanol, 3-methyl-3-methoxybutanol, propylene glycol monomethyl ether, propylene glycol monoethyl ether, propylene glycol monopropyl ether, dipropylene glycol monomethyl ether, 1,2-butanediol, 1,2-pentanediol and 1,2-hexanediol.

In the present invention, the ink may contain only one water-soluble organic solvent that corresponds with the water-soluble organic solvent (A-1), or may contain two or more water-soluble organic solvents (A-1). However, from the viewpoint of enabling better control of voids and the drying properties on low-absorption substrates, two or more water-soluble organic solvents corresponding with the water-soluble organic solvent (A-1) are preferably included in the ink. In those cases where the ink contains two or more water-soluble organic solvents (A-1), it is particularly desirable that at least one of those water-soluble organic solvents (A-1) has an HLB value of 3.0 to 6.0.

When the ink of the present invention contains two or more water-soluble organic solvents (A-1), and at least one of those water-soluble organic solvents (A-1) has an HLB value of 3.0 to 6.0, the amount of the water-soluble organic solvent (A-1) having an HLB value of 3.0 to 6.0 relative to the total weight of the ink is preferably from 1 to 25% by weight, more preferably from 3 to 20% by weight, and particularly preferably from 5 to 15% by weight. By ensuring this amount falls within the above range, an ink having particularly superior drying properties can be obtained without impairing the interactions between the azo pigment and the surfactant.

From the viewpoints of ensuring favorable discharge stability after long standby periods in the inkjet head, and obtaining superior drying properties on low-absorption substrates, the water-soluble organic solvent (A-1) in the present invention preferably contains at least one compound having a boiling point at one atmosphere of 190 to 250° C. If the boiling point of the water-soluble organic solvent (A-1) exceeds 250° C., then there is a possibility that the solvent may be retained in the printed item following the drying process, which can cause a deterioration in the color development properties and the gloss, and therefore the upper limit for the boiling point of the water-soluble organic solvent (A-1) is preferably 250° C. Among those compounds having a boiling point described above, from the viewpoints of selecting a solvent that exhibits favorable interaction with the azo pigment in order to improve the discharge stability, and obtaining an ink that exhibits superior printed image quality and drying properties, the use of an alkanediol of 4 to 6 carbon atoms is particularly desirable. The amount of the alkanediol of 4 to 6 carbon atoms relative to the total weight of the magenta ink for inkjet is preferably from 5 to 50% by weight, more preferably from 10 to 45% by weight, even more preferably from 15 to 40% by weight, and particularly preferably from 20 to 35% by weight.

Further, from the viewpoint of ensuring that the surfactant (B-1) that is not mixed with the water-soluble organic solvent (A-1) has a function that enables uniform orientation of the surfactant at the ink interface to occur readily, thereby further improving the wetting properties on low-absorption substrates and yielding an ink having superior printed image quality and drying properties, at least one glycol alkyl ether having a boiling point at one atmosphere of 100 to 250° C. is preferably included as the water-soluble organic solvent (A-1). As mentioned above, if the boiling point exceeds 250°

C., then there is a possibility that the solvent may be retained in the printed item following the drying process, which can cause a deterioration in the color development properties and the gloss, and therefore the upper limit for the boiling point of the water-soluble organic solvent (A-1) is preferably 250° C. The amount of the glycol alkyl ether having a boiling point at one atmosphere of 100 to 250° C., relative to the total weight of the magenta ink for inkjet, is preferably from 0.5 to 25% by weight, more preferably from 1 to 20% by weight, and particularly preferably from 2 to 15% by weight. It is particularly desirable that a glycol alkyl ether having a boiling point at one atmosphere of 100 to 200° C. is used as the water-soluble organic solvent (A-1).

<Other Water-Soluble Organic Solvents>

The ink of the present invention may also use water-soluble organic solvents other than the water-soluble organic solvent (A-1), provided they do not impair the quality. Examples of these water-soluble organic solvents other than the water-soluble organic solvent (A-1) include, but are not limited to, 1,2-propanediol, 1,3-propanediol, 2-methyl-1,3-propanediol, 1,3-butanediol, 1,4-butanediol, 1,5-pentanediol, 3-methyl-1,5-pentanediol, 1,6-hexanediol, glycerol, dipropylene glycol, ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monobutyl ether, diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol butyl methyl ether, triethylene glycol butyl methyl ether, tetraethylene glycol butyl methyl ether, 2-pyrrolidone, N-methylpyrrolidone, N-ethylpyrrolidone, and 3-methyl-2-oxazolidinone.

A compound having a boiling point of 250° C. to 400° C. may be used as a water-soluble organic solvent other than the water-soluble organic solvent (A-1) for the purpose of improving the moisture retention on the inkjet head and ensuring favorable discharge stability. An example of this compound having a boiling point of 250° C. to 400° C. is glycerol, but the invention is not limited to this compound. The amount of the compound having a boiling point of 250° C. to 400° C. relative to the total weight of the ink is preferably from 0 to 5% by weight. Here, "0% by weight" means that the ink does not contain that compound.

<Surfactant (B)>
<Surfactant (B-1)>

The magenta ink for inkjet of the present invention contains at least one surfactant (B-1) having an HLB value of 1.5 to 8.0 as the surfactant (B). A large variety of surfactants are known, including acetylene-based, silicone-based, acrylic-based and fluorine-based surfactants, which may be selected in accordance with the intended application, but provided the surfactant is a compound having an HLB value of 1.5 to 8.0, any single type of surfactant or combination of a plurality of surfactants may be used.

From the viewpoints of improving the miscibility with the water-soluble organic solvent (A-1), and ensuring that the surfactant (B-1) that is not mixed with the water-soluble organic solvent (A-1) orients uniformly at the ink interface, thereby further improving the wetting properties on low-absorption substrates and ensuring superior printed image quality, the HLB value of the surfactant (B-1) is preferably from 1.5 to 8.0, more preferably from 2.0 to 7.0, and particularly preferably from 2.5 to 6.0. Provided the HLB value is not more than 8.0, the surfactant (B-1) that is not mixed with the water-soluble organic solvent (A-1) will also not mix with the water that represents the main component, but rather orients uniformly at the ink interface, thereby enabling an improvement in the wetting properties on low-absorption substrates.

From the viewpoint of the interaction with the water-soluble organic solvent (A-1), the surfactant (B-1) that may be used in the present invention preferably employs a silicone-based surfactant and/or an acetylene-based surfactant, and preferably employs at least a silicone-based surfactant. Further, the use of a polyether-modified polydimethylsiloxane as the silicone-based surfactant is particularly preferred, and among such polyether-modified polydimethylsiloxanes, the use of a compound having a polyether group on a side chain of the polydimethylsiloxane chain and/or at both terminals of the polydimethylsiloxane chain is extremely desirable. Moreover from the viewpoint of ensuring that the surfactant (B-1) that is not mixed with the water-soluble organic solvent (A-1) orients rapidly at the ink interface upon impact, enabling particularly superior printed image quality to be obtained, the use of a siloxane surfactant having a polyether group on a side chain of the polydimethylsiloxane chain is the most preferred.

The silicone-based surfactants having a polyether group on a side chain of a polydimethylsiloxane chain that can be used most favorably in the present invention are compounds represented by a general formula (3) shown below.

[Chemical formula 1]

General formula (3)

$$R_2-\underset{\underset{CH_3}{|}}{\overset{\overset{CH_3}{|}}{Si}}-\left[O-\underset{\underset{CH_3}{|}}{\overset{\overset{CH_3}{|}}{Si}}\right]_p\left[O-\underset{\underset{R_1}{|}}{\overset{\overset{CH_3}{|}}{Si}}\right]_q-O-\underset{\underset{CH_3}{|}}{\overset{\overset{CH_3}{|}}{Si}}-R_2$$

In general formula (3), p represents an integer of 0 or greater, and q represents an integer of 1 or greater. Further, $R_1$ is represented by a general formula (4) shown below, and $R_2$ represents an alkyl group of 1 to 6 carbon atoms.

[Chemical formula 2]

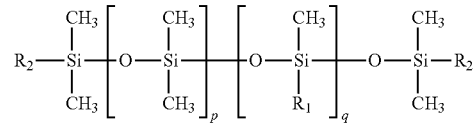

General formula (4):
$-(CH_2)_m-(OC_2H_4)_n-(OC_3H_6)_o-R_3$

In general formula (4), m represents an integer of 1 to 6, n represents an integer of 0 to 50, o represents an integer of 0 to 50, and n+o represents an integer of 1 or greater. $R_3$ represents a hydrogen atom, an alkyl group of 1 to 6 carbon atoms, or a (meth)acrylic group. Further, the order of the ethylene oxide groups and propylene oxide groups in general formula (4) may be random.

On the other hand, the silicone-based surfactants having polyether groups at both terminals of a polydimethylsiloxane chain that can also be used favorably as the surfactant (B-1) in the present invention are compounds represented by a general formula (5) shown below.

[Chemical formula 3]

General formula (5)

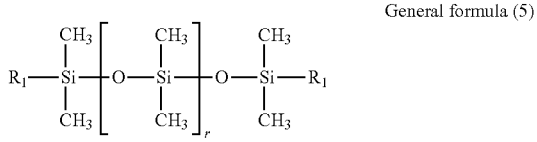

In general formula (5), r represents an integer of 1 to 80. Further, $R_1$ is represented by the general formula (4) shown above.

Furthermore, as mentioned above, an acetylenediol-based surfactant may also be used favorably as the surfactant (B-1). Acetylenediol-based surfactants exhibit extremely rapid alignment at the ink interface, improve the ink wetting properties on low-absorption substrates, and enable the dots to be smoothed, thereby enabling the formation of printed items having high gloss. Further, acetylenediol-based surfactants having an HLB value that falls within the above preferred range improve the penetration of ink droplets into low-absorption substrates, and therefore have the effect of improving the drying properties.

Examples of acetylenediol-based surfactants that can be used favorably in the present invention include, but are not limited to, 2,4,7,9-tetramethyl-5-decyne-4,7-diol, 2,5,8,11-tetramethyl-6-dodecyne-5,8-diol, hexadeca-8-yne-7,10-diol, 6,9-dimethyltetradeca-7-yne-6,9-diol, 7,10-dimethylhexadeca-8-yne-7,10-diol, and ethylene oxide adducts and/or propylene oxide adducts of these compounds. However, in terms of ensuring that the HLB value satisfies the above preferred range, and that the protective function on the azo pigment is thought to be favorable, the acetylenediol-based surfactant preferably does not have ethylene oxide groups and/or propylene oxide groups.

From the viewpoints of ensuring that the surfactant (B-1) that is not mixed with the water-soluble organic solvent (A-1) orients at the ink interface in a favorable amount and at a favorable rate, thereby ensuring superior printed image quality and drying properties, the use of a combination of a silicone-based surfactant and an acetylenediol-based surfactant as the surfactant (B-1) is particularly desirable.

The amount of the surfactant (B-1) in the magenta ink for inkjet according to the present invention, relative to the total weight of the ink, is preferably from 0.1 to 10% by weight, more preferably from 0.5 to 8% by weight, and even more preferably from 1 to 6% by weight.

<Pigment Dispersing Resin>

When an azo pigment is used in the present invention, in order to maintain good ink stability over a long period of time and ensure favorable discharge stability after a standby period, the pigment is preferably used in a dispersed state within the ink. Examples of the method used for dispersing the pigment include methods of dispersing the pigment without a dispersant by modifying the surface of the pigment using an oxidation treatment or the like, and methods of dispersing the pigment using a surfactant or a resin as a dispersant. In order to obtain an ink having more favorable storage stability and discharge stability, the pigment is preferably dispersed using a pigment dispersing resin.

Examples of the pigment dispersing resin include (meth)acrylic resins, maleic acid resins, α-olefin/maleic acid resins, urethane resins, and ester resins. Among these, from the viewpoint of enabling the structure to be altered and adjusted easily so that the interaction between the azo pigment and the water-soluble organic solvent (A-1) can be assisted, the use of a (meth)acrylic resin is preferred. Further, among acrylic resins, in terms of achieving more powerful adsorption of the pigment, thereby better stabilizing the pigment dispersion and improving the dispersion stability of the pigment, as well as ensuring superior discharge stability and excellent color development on low-absorption substrates, the resin preferably contains a (meth)acrylic resin that includes a monomer containing an aromatic ring within the copolymerization composition. In the present description, a "(meth)acrylic resin" means a resin that contains at least one methacrylic-based monomer (for example, methacrylic acid, methyl methacrylate, butyl methacrylate, ethylhexyl methacrylate, lauryl methacrylate, stearyl methacrylate, benzyl methacrylate, or phenoxyethyl methacrylate or the like) or acrylic-based monomer (for example, acrylic acid, methyl acrylate, butyl acrylate, ethylhexyl acrylate, lauryl acrylate, stearyl acrylate, benzyl acrylate, or phenoxyethyl acrylate or the like) as a structural component. The (meth)acrylic resin that may be used in the present invention may also include a styrene-based monomer (for example, styrene, methylstyrene, or methoxystyrene or the like) as a structural component monomer.

Examples of the aromatic ring structure include a phenyl group, naphthyl group, anthryl group, tolyl group, xylyl group, mesityl group and anisyl group. Among these, a phenyl group or tolyl group is preferred in terms of the pigment dispersion stability.

The weight average molecular weight of the pigment dispersing resin that may be used in the present invention is preferably within a range from 5,000 to 100,000. If the weight average molecular weight is less than 5,000, then dispersion stability cannot be adequately ensured, and pigment aggregation is more likely to occur during drying, causing a deterioration in the gloss and color development properties, and discharge faults are more likely to occur after a long standby period. If the weight average molecular weight exceeds 100,000, then the ink viscosity is more likely to increase when water volatilization occurs. Particularly in those cases where the inkjet printer is placed in standby mode for a long period, the ink viscosity may increase when the ink becomes more concentrated due to volatilization of water in the vicinity of the inkjet nozzles, which can lead to problems such as discharge faults. In order to ensure favorable dispersion stability and excellent printed image quality, the weight average molecular weight of the pigment dispersing resin is more preferably within a range from 15,000 to 50,000, and particularly preferably from 15,000 to 40,000.

The weight average molecular weight of the pigment dispersing resin in the present invention can be measured using typical methods. In the present invention, the method used for measuring the weight average molecular weight of the pigment dispersing resin is described below, with the weight average molecular weight representing the polystyrene-equivalent weight average molecular weight measured using a TSKgel column (manufactured by Tosoh Corporation) and a GPC (HLC-8120GPC, manufactured by Tosoh Corporation) fitted with an RI detector, using THF as the eluent.

Moreover, the pigment dispersing resin of the present invention preferably includes a monomer containing an alkyl chain of 8 to 30 carbon atoms within the copolymerization composition. From the viewpoints of improving the dispersion stability to ensure favorable discharge stability from the inkjet head, and using the pigment dispersing resin to maintain the dispersion stability of the pigment on low-absorption substrates during the drying process, thereby ensuring favorable color development and gloss, the pigment dispersing resin more preferably contains an alkyl chain of 10 to 28 carbon atoms, and even more preferably contains an alkyl chain of 12 to 24 carbon atoms.

The alkyl chain of at least 8 carbon atoms may be a linear or branched chain, but a linear chain is preferred. Examples of the alkyl chain include an ethylhexyl group (C8), decyl group (C10), lauryl group (C12), myristyl group (C14), cetyl group (C16), stearyl group (C18), arachyl group (C20), behenyl group (C22), lignoceryl group (C24), cerotoyl group (C26), montanyl group (C28), and melissyl group (C30).

The acid value of the pigment dispersing resin that may be used in the present invention is preferably from 30 to 400 mgKOH/g. By ensuring that the acid value falls within this range, the solubility of the pigment dispersing resin in the ink can be ensured, and the ink viscosity can be kept within a suitable range. The acid value of the pigment dispersing resin is more preferably from 100 to 300 mgKOH/g.

In order to improve the solubility in water, acid groups in the pigment dispersing resin that may be used in the present invention are preferably neutralized with a base. Examples of bases that may be used include organic bases such as ammonia water, dimethylaminoethanol, diethanolamine and triethanolamine, and inorganic bases such as lithium hydroxide, sodium hydroxide and potassium hydroxide. If an organic base is used, then the base may volatilize during drying and can sometimes improve the water resistance of the printed item, which is preferred.

In the present invention, pigment to pigment dispersing resin ratio is preferably within a range from 1.5/1 to 100/1. If the pigment to pigment dispersing resin ratio is greater than a ratio of 1.5/1, then an increase in the ink viscosity tends to be observed. Further, if the pigment to pigment dispersing resin ratio is less than a ratio of 100/1, then the dispersion stability may sometimes deteriorate. From the viewpoints of ensuring excellent dispersion stability and obtaining printed image quality having superior color development and gloss, the ratio between the pigment and the pigment dispersing resin is more preferably within a range from 2/1 to 20/1, even more preferably from 2.5/1 to 10/1, and particularly preferably from 3/1 to 10/1.

<Binder Resin>

The magenta ink for inkjet according to the present invention may also use a binder resin to improve the drying properties of the ink on low-permeation substrates and the coating film durability of the printed items. In the present invention, a "binder resin" is used to enable the printed item to adhere tightly to the low-absorption substrate, and to impart the printed item with abrasion resistance and water resistance. Further, the binder resin may also have a function of stabilizing the dispersion state of the azo pigment in the ink, but does not function as a pigment dispersing resin described above. A determination as to whether or not a resin functions as a pigment dispersing resin can be made, for example, by producing a magenta ink using the method described below in the examples, and then evaluating the storage stability of that ink.

Known binder resins for aqueous inks can be broadly classified as either water-soluble resins or resin microparticles. Generally, resin microparticles have higher molecular weights than water-soluble resins and can produce superior durability, but once a film forms, re-dissolution of the film is difficult, and therefore if the ink is retained in the inkjet head for a long standby period, problems such as nozzle blockages can be a concern. Accordingly, in the ink of the present invention, the use of a water-soluble resin that ensures favorable discharge stability after long standby periods is preferred as the binder resin.

Examples of water-soluble binder resins that may be used in the present invention include, but are not limited to, (meth)acrylic-based resins, styrene/(meth)acrylic-based resins, urethane-based resins, styrene/butadiene-based resins, vinyl chloride-based resins and polyolefin-based resins. From the viewpoint of ensuring favorable discharge stability from the inkjet nozzles, the use of a (meth)acrylic-based resin is preferred.

From the viewpoints of ensuring favorable discharge stability from the inkjet nozzles, and obtaining excellent coating film durability even on low-absorption substrates, the weight average molecular weight of the binder resin that may be used in the present invention is preferably within a range from 3,000 to 50,000, more preferably from 5,000 to 40,000, and particularly preferably from 10,000 to 30,000. If the weight average molecular weight exceeds 50,000, then the ink is more likely to undergo an increase in viscosity when moisture in the ink volatilizes on the end face of the inkjet nozzles, which can cause discharge faults and the like.

The weight average molecular weight of the binder resin in the present invention can be measured using typical methods. In the present invention, the method used for measuring the weight average molecular weight of the binder resin is described below. The weight average molecular weight is the polystyrene-equivalent weight average molecular weight measured using a TSKgel column (manufactured by Tosoh Corporation) and a GPC (HLC-8120GPC, manufactured by Tosoh Corporation) fitted with an RI detector, using THF as the eluent.

In the present invention, by increasing the glass transition point temperature (Tg) of the binder resin, the durability such as the abrasion resistance and the chemical resistance can be further improved. The glass transition point temperature (Tg) of the binder resin is preferably within a range from 40 to 120° C., and more preferably within a range from 50 to 110° C. A glass transition point temperature (Tg) of at least 40° C. enables favorable durability to be more easily obtained, and is also preferred from the viewpoint of suppressing peeling of the printing from the printed item in actual applications. Further, a glass transition point temperature (Tg) of not more than 120° C. enables the hardness of the coating film to be more easily maintained within an appropriate range, and is also preferred from the viewpoint of suppressing the occurrence of cracking or splitting of the printed surface when the printed item is folded.

The glass transition point temperature is a value determined using a DSC (differential scanning calorimeter), and can be measured, for example, in the following manner. First, a sample of about 2 mg of the dried and solidified binder resin composition is weighed onto an aluminum pan, the test container containing the sample is then set on the DSC measurement holder, and the endothermic peak value is read from the chart obtained at a rate of temperature increase of 5° C./minute. This peak temperature is used as the glass transition temperature in the present description.

From the viewpoint of improving the durability such as the water resistance and chemical resistance, the acid value of the binder resin that may be used in the present invention is preferably within a range from 1 to 100 mgKOH/g, and more preferably from 5 to 60 mgKOH/g.

The amount of the above type of binder resin in the ink composition, expressed as a non-volatile fraction, is preferably within a range from 1 to 20% by weight, and more preferably from 3 to 15% by weight, of the total weight of the ink.

<Water>

The water contained in the magenta ink for inkjet according to the present embodiment is preferably not a typical water containing all manner of ions, but rather an ion-exchanged water (deionized water).

The amount of water that may be used in the present invention is typically within a range from 20 to 90% by weight of the total weight of the ink.

<Other Components>

Furthermore, besides the components described above, the ink of the present invention may also include suitable amounts of additives such as anti-foaming agents and preservatives, which may be added as required to obtain an ink having certain desired physical properties. An example of the amount added of these additives is preferably at least 0.01% by weight but not more than 10% by weight relative to the total weight of the ink.

<Dynamic Surface Tension of Ink>

In order to ensure that the magenta ink for inkjet according to the present invention undergoes rapid wet spreading immediately upon striking the low-absorption substrate, thereby yielding excellent printed image quality with no voids or density irregularities, the dynamic surface tension of the ink at 10 milliseconds, calculated using the maximum bubble pressure method, is preferably within a range from 25 to 45 mN/m, and is more preferably from 25 to 35 mN/m. Specifically, the dynamic surface tension at 25° C. can be measured by the maximum bubble pressure method using a bubble pressure dynamic surface tension meter BP 100 (manufactured by Kruss GmbH), and is calculated from the dynamic surface tension at a lifetime of 10 milliseconds.

<Ink Set>

The magenta ink for inkjet according to the present invention may be used as a single color, or depending on the application, may be combined with a plurality of colors and used in an ink set. There are no particular limitations on the color combination, but by using the three colors of cyan, yellow and magenta, full color images can be obtained. Further, by also adding a black ink, the level of blackness can be improved, and the legibility of text and the like can be improved. Moreover, by also adding colors such as orange and green, the color reproducibility can also be improved. When printing is to be conducted onto print media that is not white, including a white ink enables more distinct images to be obtained.

When a combination of cyan, yellow and magenta inks is used as the inkjet ink set of the present invention, appropriate pigments should be selected in order to achieve superior color reproducibility when printing to low-absorption substrates. For the cyan pigment, a pigment selected from among C.I. Pigment Blue 15:3 and 15:4 is preferred. For the yellow pigment, a pigment selected from among C.I. Pigment Yellow 14, 74, 83, 120, 150 and 180 is preferred, and C.I. Pigment Yellow 14, 74 and 180 are more preferred. Further, from the viewpoint of suppressing mixed color bleeding and obtaining superior color reproducibility, the use of C.I. Pigment Yellow 14, which exhibits superior dissolution stability in water-soluble organic solvents, is particularly preferred. By using the magenta ink of the present invention as the magenta ink, excellent color reproducibility can be obtained.

When a combination of cyan, yellow and magenta inks is used as the inkjet ink set, from the viewpoints of achieving excellent wetting properties on low-absorption substrates and enabling suppression of mixed color bleeding between liquid droplets, it is preferable that the cyan ink and the yellow ink each contain at least one surfactant (B-1) having an HLB value of not more than 8, and are then combined with the magenta ink of the present invention.

Moreover, in order to improve the wetting properties upon striking low-absorption substrates, enabling superior printed image quality and color reproducibility to be achieved, in those cases where a combination of cyan, yellow and magenta inks are used as the inkjet ink set, the dynamic surface tension at 10 milliseconds for each ink, calculated using the maximum bubble pressure method, is preferably within a range from 25 to 45 mN/m, and more preferably from 25 to 35 mN/m.

<Method for Preparing Ink>

An example of the method used for preparing the ink of the present invention containing the types of components described above is described below, but the present invention is not limited to the following method. First, the pigment is added to an aqueous medium containing a mixture of at least the pigment dispersing resin and water, and following mixing and stirring, a dispersion treatment is performed using the dispersion device described below, and an additional centrifugal separation treatment is then performed as required, thus obtaining the desired pigment dispersion. Subsequently, a water-soluble organic solvent, and/or any appropriately selected additive components described above are added to the pigment dispersion as required, and the dispersion is then mixed and filtered where necessary to obtain an ink of the present invention.

In the method for preparing an ink according to the present invention, as described above, a pigment dispersion obtained by performing a dispersion treatment is used in the ink preparation, but it is effective to conduct premixing prior to the dispersion treatment performed during the pigment dispersion preparation. Premixing may be performed by adding the pigment to an aqueous medium containing a mixture of at least the pigment dispersing resin and water. This type of premixing operation is preferable, as it improves the wetting properties of the pigment surface and can promote the adsorption of the dispersant to the pigment surface.

The dispersion device used during the dispersion treatment of the pigment may be any commonly used dispersion device, and examples include a ball mill, roll mill, sand mill, beads mill, and nanomizer. Among these, a beads mill can be used particularly favorably. Specific examples of such beads mills include a Super Mill, Sand Grinder, Agitator Mill, Glen Mill, Dyno Mill, Pearl Mill and Cobol Mill (all of which are brand names).

Moreover, in the premixing and the dispersion treatment of the pigment, the pigment dispersant may be dissolved or dispersed in only water, or may be dissolved or dispersed in a mixed solvent containing an organic solvent and water.

As described above, the pigment contained in the ink of the present invention preferably uses a pigment having an optimal particle size distribution. In order to obtain a pigment having the desired particle size distribution, the following methods may be used. These techniques include reducing the size of the grinding media used in the types of dispersion devices described above, altering the material of the grinding media, increasing the fill ratio of the grinding media, altering the shape of the stirring member (agitator), lengthening the dispersion treatment time, performing additional classification by filtering or centrifugal separation after the grinding treatment, and combinations of these techniques. In order to ensure that the pigment in the present invention satisfies the preferred particle size range described above, the grinding media in the dispersion device preferably has a diameter of 0.1 to 3 mm. Further, examples of materials that can be used favorably for the grinding media include glass, zircon, zirconia and titania.

In those cases where the ink of the present invention contains two or more pigments, the ink may be prepared by producing pigment dispersions of each of the pigments and then mixing the dispersions, or the ink may be prepared by producing a pigment dispersion containing the two or more pigments, and although the details are not entirely clear, in terms of obtaining an ink having superior storage stability and clarity, the method in which a pigment dispersion containing the two or more pigments is produced is preferably selected.

Further, in those cases where pigment dispersions of each of the pigments are produced, a different pigment dispersing resin may be selected for each pigment dispersion, or the same pigment dispersing resin may be used, but from the viewpoint of the ink storage stability, the same pigment dispersing resin is preferably used.

<Low-Absorption Substrates>

The low-absorption substrates that may be used in the present invention are substrates that either do not absorb water or have a slow absorption rate, and are substrates which have a water absorption coefficient, measured by Bristow's method described below (J. TAPPI paper pulp test method No. 51-87), of 0 to 0.6 ml/m$^2$ msec$^{1/2}$. Specific examples of low-absorption substrates include, but are not limited to, paper media such as coated papers, art papers, finely coated papers and cast coated papers, and plastic substrates such as polyvinyl chloride sheets, PET films and PP films. In the low-absorption substrates that may be used in the present invention, the surface of the print medium may be smooth or uneven, and the print medium may be transparent, semi-transparent or opaque. Further, two or more of these print media may be bonded together. Moreover, a peelable adhesive layer or the like may be provided on the opposite side from the printing surface, or an adhesive layer may be provided on the printed surface following printing.

The water absorption coefficient mentioned above can be measured, for example, using an Auto Scan absorption meter manufactured by Kumagai Riki Kogyo Co., Ltd. Specifically, by using the above apparatus and water, a relationship plot is generated between the amount of water absorption (ml/m$^2$) in a contact time of 100 to 1,000 milliseconds and the square root of the contact time (msec$^{1/2}$), and the gradient of the straight line obtained by the least squares method is deemed to represent the absorption coefficient.

<Printing Method>

The method used for printing the inkjet ink of the present invention employs a method in which the ink is discharged from the nozzles of an inkjet head, and the ink droplets are adhered to a printing substrate.

<Spectral Reflectance of Ink Coated Product>

The magenta ink of the present invention preferably has a spectral reflectance for an ink coated product having a wet film thickness of 6 μm formed on a recording medium that is not more than 10% in the wavelength region from 480 to 580 nm. As described above, in the magenta ink of the present invention, it is thought that the balance between the azo pigment, the water-soluble organic solvent (A-1) and the surfactant (B-1) is an important factor, and the inventors of the present invention discovered that depending on the type of azo pigment used, the range of formulations capable of achieving a favorable balance differed. Although detailed reasons remain unclear, it is thought that if a portion of the azo pigment aggregates within the ink, then the balance between the blend amounts of the various components may be destroyed, and that this aggregation also means that the inherent favorable color development properties and color reproducibility of the azo pigment are unable to manifest satisfactorily. Further, it is also thought that this deterioration in quality including the color development and the color reproducibility is more likely to occur when printing is conducted onto low-absorption substrates.

If the aggregation described above is severe, then the presence of aggregates can be determined, for example, by measurement of the particle size of the ink or the like, but in those cases where only a portion of the pigment has undergone some aggregation, the aggregation cannot be confirmed by this type of ink particle size measurement. As a result of intensive investigation, the inventors of the present invention discovered that by measuring the spectral reflectance in the wavelength region from 480 to 580 nm, even small amounts of aggregation could be readily determined. This is because those components that volatilize from the ink upon drying have almost no effect on the reflectance in the above wavelength region, meaning there is almost no change in value between the wet coating film and the dried coating film, and therefore by suppressing the spectral reflectance of the coated product having a wet film thickness of 6 μm formed on the recording medium to a value of not more than 10% in the wavelength region from 480 to 580 nm, the range of formulations that are able to maintain the balance between the water-soluble organic solvent (A-1) and the surfactant (B-1) is broad, and a magenta ink can be obtained in which the inherent color development properties and color reproducibility of the azo pigment are able to manifest satisfactorily.

One specific example of the method used for measuring the spectral reflectance in the present invention is a method in which the magenta ink of the present invention is coated onto a recording medium using a K Control Coater K202 manufactured by Matsuo Sangyo Co., Ltd. and a wire bar No. 1, drying is performed for 3 minutes in a 60° C. air oven to produce a coated product, and the spectral reflectance of the coated product is then measured using an i1 Pro2 device manufactured by X-Rite Inc. During the measurement of the spectral reflectance, measurements are performed at 10 nm intervals within the wavelength region from 480 to 580 nm, and it is preferable that the spectral reflectance is not more than 10% across the entire region.

For the above coated product, a solid image obtained by using an inkjet printer to print a solid image onto a recording medium may be used, with the amount of ink discharged being adjusted to produce a wet film thickness of 6±0 0.3 μm. Further, there are no particular limitations on the recording medium provided it is white, but OK Topcoat+ paper manufactured by Oji Paper Co., Ltd. (basis weight: 104.7 g/m$^2$) is preferred.

As described above, using at least one pigment selected from among C.I. Pigment Red 31, 146, 147, 150, 266 and 269 as the azo pigment enables the spectral reflectance in the wavelength region from 480 to 580 nm to be kept within the above range, regardless of the types and amounts of the water-soluble organic solvent (A-1) and the surfactant (B-1), and is consequently preferred.

Further, for any particular pigment, examples of methods that may be used for ensuring that the spectral reflectance in the wavelength region from 480 to 580 nm satisfies the above range include, for example, combining two or more azo pigments, combining the azo pigment with another pigment, adjusting the dispersion time or the grinding media used in the dispersion device, using a pigment dispersing resin described above and adjusting the type and amount of that resin, and using a dispersion aid such as a pigment derivative in combination with the pigment.

EXAMPLES

The present invention is described below in further detail using a series of examples and comparative examples. In the following description, unless specifically stated otherwise, "parts" and "%" represent "parts by weight" and "% by weight" respectively.
<Pigment Dispersing Resins>
<Production Example for Pigment Dispersing Resin 1>

A reaction container fitted with a gas inlet tube, a thermometer, a condenser and a stirrer was charged with 93.4 parts of butanol, and the inside of the container was flushed with nitrogen gas. The contents of the reaction container were heated to 110° C., and a mixture containing 30 parts of acrylic acid, 40 parts of methyl methacrylate and 30 parts of stearyl methacrylate as polymerizable monomers and 6 parts of a polymerization initiator V-601 (manufactured by Wako Pure Chemical Industries, Ltd.) was added dropwise to the container over a period of two hours to effect a polymerization reaction. Following completion of the dropwise addition, reaction was continued at 110° C. for a further three hours, an additional 0.6 parts of V-601 (manufactured by Wako Pure Chemical Industries, Ltd.) was then added, and the reaction was continued at 110° C. for a further one hour, thus obtaining a solution of a dispersing resin 1. Following cooling to room temperature, 37.1 parts of dimethylaminoethanol was added to neutralize the solution, and 100 parts of water was added to generate an aqueous solution. Subsequently, the mixture was heated to at least 100° C., and the butanol was removed by azeotropic distillation with water to adjust the solid fraction concentration to 50%. This yielded an aqueous solution of the pigment dispersing resin 1 with a solid fraction of 50%.
<Production Examples for Pigment Dispersing Resins 2 to 6>

With the exception of using the monomers shown in Table 1 as the polymerizable monomers, aqueous solutions of pigment dispersing resins 2 to 6, each having a solid fraction of 50%, were obtained using the same procedure as that described for the pigment dispersing resin 1.

TABLE 1

| | Monomer Components | | | | | Weight average molecular weight | Acid value |
|---|---|---|---|---|---|---|---|
| | St | AA | MMA | 2EHA | STMA | | |
| Pigment dispersing resin 1 | | 30 | 40 | | 30 | 18000 | 230 |
| Pigment dispersing resin 2 | 40 | 30 | | | 30 | 25000 | 234 |
| Pigment dispersing resin 3 | 40 | 30 | | | 30 | 48000 | 232 |
| Pigment dispersing resin 4 | 40 | 30 | | | 30 | 54000 | 228 |
| Pigment dispersing resin 5 | 40 | 30 | | | 30 | 13000 | 235 |
| Pigment dispersing resin 6 | 40 | 30 | | 30 | | 25000 | 230 |

The abbreviations used in Table 1 have the following meanings.
St: styrene
AA: acrylic acid
MMA: methyl methacrylate
2EHA: 2-ethylhexyl acrylate
STMA: stearyl methacrylate
<Surfactant (B-1)>
<Synthesis of Acetylenediol-Based Surfactants>

Using the method disclosed in Example 1 of JP 2002-356451 A, by using methyl isoamyl ketone as the raw material ketone, 2,5,8,11-tetramethyl-6-dodecyne-5,8-diol (acetylenediol 1) was synthesized. The HLB value of the acetylenediol 1 is 2.7. Further, in a similar manner, by using methyl isobutyl ketone as the raw material ketone, 2,4,7,9-tetramethyl-5-decyne-4,7-diol (acetylenediol 2) was synthesized. The HLB value of the acetylenediol 2 is 3.0.

In the examples, the commercially available products Surfynol 440 (manufactured by Air Products Japan K.K., HLB value=8.0) and Surfynol 465 (manufactured by Air Products Japan K.K., HLB value=13.0) were also used as acetylenediol-based surfactants.
<Synthesis of Silicone-Based Surfactants>
<Synthesis Example for Polyether-Modified Siloxane 1>

A reaction container fitted with a gas inlet tube, a thermometer, a condenser and a stirrer was charged with 360 g of diethylene glycol allyl methyl ether and 0.5 g of a 0.5% by weight toluene solution of platinic chloride, and the inside of the container was flushed with nitrogen gas. The contents of the reaction container were heated to 70° C., and 480 g of hexadecamethyloctasiloxane having hydrogen atoms at both terminals of the siloxane chain was added dropwise to the container over a period of 30 minutes. Subsequently, the contents of the reaction container were heated to 110° C., and the above materials were reacted by holding the temperature at 110° C. for 3 hours under constant stirring. Following completion of the reaction, the low-boiling point components were removed by distillation under reduced pressure, yielding a polyether-modified siloxane 1. The polyether-modified siloxane 1 had a structure represented by general formula (5), wherein r=6, and $R_1$ is a group of general formula (4) in which m=3, n=2, o=0 and $R_3$ is $CH_3$. The HLB value of this compound is 7.5.
<Synthesis Example for Polyether-Modified Siloxane 2>

With the exceptions of altering the amount added of the ethylene glycol allyl methyl ether to 180 g, and using 200 g of heptamethyltrisiloxane in which one hydrogen atom is bonded to the central silicon atom instead of the hexadecamethyloctasiloxane, a polyether-modified siloxane 2 was obtained using the same method as that described for the polyether-modified siloxane 1. The polyether-modified siloxane 2 had a structure represented by general formula (3), wherein p=0, q=1, $R_2$ is $CH_3$, and $R_1$ is a group of general formula (4) in which m=3, n=1, o=0 and $R_3$ is $CH_3$. The HLB value of this compound is 4.6.
<Synthesis Example for Polyether-Modified Siloxane 3>

With the exceptions of using an amount added of the ethylene glycol allyl methyl ether of 360 g, and using 240 g of octamethylheptanetetrasiloxane in which two hydrogen atoms were bonded to the central silicon atoms instead of the hexadecamethyloctasiloxane, a polyether-modified siloxane 3 was obtained using the same method as that described for the polyether-modified siloxane 1. The polyether-modified siloxane 3 had a structure represented by general formula (3), wherein p=0, q=2, $R_2$ is $CH_3$, and $R_1$ is a group of general formula (4) in which m=3, n=1, o=0 and $R_3$ is $CH_3$. The HLB value of this compound is 7.5.

<Synthesis Example for Polyether-Modified Siloxane 4>

With the exceptions of altering the amount added of the ethylene glycol allyl methyl ether to 640 g, and using 480 g of dotriacontylhexadecasiloxane having hydrogen atoms at both terminals of the siloxane chain, instead of the hexadecamethyloctasiloxane, a polyether-modified siloxane 4 was obtained using the same method as that described for the polyether-modified siloxane 1. The polyether-modified siloxane 4 had a structure represented by general formula (5), wherein r=14 and $R_1$ is a group of general formula (4) in which m=3, n=1, o=0 and $R_3$ is $CH_3$. The HLB value of this compound is 1.9.

<Synthesis Example for Polyether-Modified Siloxane 5>

With the exceptions of altering the amount added of the diethylene glycol allyl methyl ether to 180 g, and using 200 g of heptamethyltrisiloxane in which one hydrogen atom is bonded to the central silicon atom instead of the hexadecamethyloctasiloxane, a polyether-modified siloxane 5 was obtained using the same method as that described for the polyether-modified siloxane 1. The polyether-modified siloxane 5 had a structure represented by general formula (3), wherein p=0, q=1, $R_2$ is $CH_3$, and $R_1$ is a group of general formula (4) in which m=3, n=2, o=0 and $R_3$ is $CH_3$. The HLB value of this compound is 9.2.

<Synthesis Example for Polyether-Modified Siloxane 6>

With the exceptions of altering the amount added of the ethylene glycol allyl methyl ether to 640 g, and using 480 g of pentacontylpentacosasiloxane having hydrogen atoms at both terminals of the siloxane chain, instead of the hexadecamethyloctasiloxane, a polyether-modified siloxane 6 was obtained using the same method as that described for the polyether-modified siloxane 1. The polyether-modified siloxane 6 had a structure represented by general formula (5), wherein r=23 and $R_1$ is a group of general formula (4) in which m=3, n=1, o=0 and $R_3$ is $CH_3$. The HLB value of this compound is 1.2.

<Binder Resin>

For the binder resin used in the examples, a water-soluble resin 1 (a random copolymer of styrene:methacrylic acid:methyl methacrylate=20:5:75 (weight ratio), weight average molecular weight: 16,000, acid value: 33, Tg: 107° C., solid fraction: 40%) was used.

<Pigment Dispersions>

<Production Example for Magenta Pigment Dispersion 1>

Twenty parts of C.I. Pigment Red 150 as a pigment, 10 parts of the aqueous solution of the pigment dispersing resin 1 and 70 parts of water were mixed, and following preliminary dispersion using a Disper, a Dyno Mill with a capacity of 0.6 L filled with 1,800 g of zirconia beads having a diameter of 0.5 mm was used to perform the main dispersion, thus obtaining a magenta pigment dispersion 1 (MB1).

<Production Examples for Magenta Pigment Dispersions 2 to 60>

With the exception of using the raw materials shown in Table 2, pigment dispersion was conducted using the same procedure as that described for the magenta pigment dispersion 1, thus obtaining magenta pigment dispersions 2 to 60 (MB2 to MB60).

TABLE 2

| | Pigments | | | | | | | | |
|---|---|---|---|---|---|---|---|---|---|
| | Naphthol AS pigments | | | | | | Other azo pigments | | |
| | P.R.150 | P.R.31 | P.R.146 | P.R.147 | P.R.266 | P.R.269 | P.R.1 | P.R.166 | P.R.242 |
| Magenta pigment dispersion 1 | 20% | | | | | | | | |
| Magenta pigment dispersion 2 | 20% | | | | | | | | |
| Magenta pigment dispersion 3 | 20% | | | | | | | | |
| Magenta pigment dispersion 4 | 20% | | | | | | | | |
| Magenta pigment dispersion 5 | 20% | | | | | | | | |
| Magenta pigment dispersion 6 | 20% | | | | | | | | |
| Magenta pigment dispersion 7 | | 20% | | | | | | | |
| Magenta pigment dispersion 8 | | | 20% | | | | | | |
| Magenta pigment dispersion 9 | | | | 20% | | | | | |
| Magenta pigment dispersion 10 | | | | | 20% | | | | |
| Magenta pigment dispersion 11 | | | | | | 20% | | | |
| Magenta pigment dispersion 12 | | | | | | | 20% | | |
| Magenta pigment dispersion 13 | | | | | | | | 20% | |
| Magenta pigment dispersion 14 | | | | | | | | | 20% |
| Magenta pigment dispersion 15 | | | | | | | | | |
| Magenta pigment dispersion 16 | | | | | | | | | |
| Magenta pigment dispersion 17 | | | 18% | | | | | | |
| Magenta pigment dispersion 18 | | | 10% | | | | | | |

TABLE 2-continued

| Dispersion | Col 1 | Col 2 | Col 3 | Col 4 | Col 5 | Col 6 |
|---|---|---|---|---|---|---|
| Magenta pigment dispersion 19 | | 2% | | | | |
| Magenta pigment dispersion 20 | 18% | | | | | |
| Magenta pigment dispersion 21 | 10% | | | | | |
| Magenta pigment dispersion 22 | 2% | | | | | |
| Magenta pigment dispersion 23 | | | 18% | | | |
| Magenta pigment dispersion 24 | | | 10% | | | |
| Magenta pigment dispersion 25 | | | 2% | | | |
| Magenta pigment dispersion 26 | | | | 18% | | |
| Magenta pigment dispersion 27 | | | | 10% | | |
| Magenta pigment dispersion 28 | | | | 2% | | |
| Magenta pigment dispersion 29 | 18% | 2% | | | | |
| Magenta pigment dispersion 30 | 10% | 10% | | | | |
| Magenta pigment dispersion 31 | 2% | 18% | | | | |
| Magenta pigment dispersion 32 | 18% | | 2% | | | |
| Magenta pigment dispersion 33 | 10% | | 10% | | | |
| Magenta pigment dispersion 34 | 2% | | 18% | | | |
| Magenta pigment dispersion 35 | 11% | | | | | |
| Magenta pigment dispersion 36 | 16% | | | | | |
| Magenta pigment dispersion 37 | | 11% | | | | |
| Magenta pigment dispersion 38 | | 16% | | | | |
| Magenta pigment dispersion 39 | | | 11% | | | |
| Magenta pigment dispersion 40 | | | 16% | | | |
| Magenta pigment dispersion 41 | | | | 11% | | |
| Magenta pigment dispersion 42 | | | | 16% | | |
| Magenta pigment dispersion 43 | | | | | 11% | |
| Magenta pigment dispersion 44 | | | | | 16% | |
| Magenta pigment dispersion 45 | | | | | | 11% |
| Magenta pigment dispersion 46 | | | | | | 16% |
| Magenta pigment dispersion 47 | 11% | | | | | |
| Magenta pigment dispersion 48 | 16% | | | | | |
| Magenta pigment dispersion 49 | 11% | | | | | |
| Magenta pigment dispersion 50 | 16% | | | | | |
| Magenta pigment dispersion 51 | | | | | | |
| Magenta pigment dispersion 52 | | | | | | |
| Magenta pigment dispersion 53 | | | | | | |
| Magenta pigment dispersion 54 | | | | | | |
| Magenta pigment dispersion 55 | | | | | | |
| Magenta pigment dispersion 56 | | | | | | |
| Magenta pigment dispersion 57 | 20% | | | | | |
| Magenta pigment dispersion 58 | 20% | | | | | |

TABLE 2-continued

| | | | | | | | |
|---|---|---|---|---|---|---|---|
| Magenta pigment dispersion 59 | 20% | | | | | | |
| Magenta pigment dispersion 60 | 20% | | | | | | |

| | Pigments | | | | Pigment dispersing resin | | |
|---|---|---|---|---|---|---|---|
| | Azo lake pigment | Quinacridone pigments | | | | | |
| | P.R.48:3 | P.R.122 | P.R.202 | P.R.209 | Type | Amount | Water |
| Magenta pigment dispersion 1 | | | | | Pigment dispersing resin 1 | 10% | balance |
| Magenta pigment dispersion 2 | | | | | Pigment dispersing resin 2 | 10% | balance |
| Magenta pigment dispersion 3 | | | | | Pigment dispersing resin 3 | 10% | balance |
| Magenta pigment dispersion 4 | | | | | Pigment dispersing resin 4 | 10% | balance |
| Magenta pigment dispersion 5 | | | | | Pigment dispersing resin 5 | 10% | balance |
| Magenta pigment dispersion 6 | | | | | Pigment dispersing resin 6 | 10% | balance |
| Magenta pigment dispersion 7 | | | | | Pigment dispersing resin 2 | 10% | balance |
| Magenta pigment dispersion 8 | | | | | Pigment dispersing resin 2 | 10% | balance |
| Magenta pigment dispersion 9 | | | | | Pigment dispersing resin 2 | 10% | balance |
| Magenta pigment dispersion 10 | | | | | Pigment dispersing resin 2 | 10% | balance |
| Magenta pigment dispersion 11 | | | | | Pigment dispersing resin 2 | 10% | balance |
| Magenta pigment dispersion 12 | | | | | Pigment dispersing resin 2 | 10% | balance |
| Magenta pigment dispersion 13 | | | | | Pigment dispersing resin 2 | 10% | balance |
| Magenta pigment dispersion 14 | | | | | Pigment dispersing resin 2 | 10% | balance |
| Magenta pigment dispersion 15 | | 20% | | | Pigment dispersing resin 2 | 10% | balance |
| Magenta pigment dispersion 16 | 20% | | | | Pigment dispersing resin 2 | 10% | balance |
| Magenta pigment dispersion 17 | 2% | | | | Pigment dispersing resin 2 | 10% | balance |
| Magenta pigment dispersion 18 | 10% | | | | Pigment dispersing resin 2 | 10% | balance |
| Magenta pigment dispersion 19 | 18% | | | | Pigment dispersing resin 2 | 10% | balance |
| Magenta pigment dispersion 20 | 2% | | | | Pigment dispersing resin 2 | 10% | balance |
| Magenta pigment dispersion 21 | 10% | | | | Pigment dispersing resin 2 | 10% | balance |
| Magenta pigment dispersion 22 | 18% | | | | Pigment dispersing resin 2 | 10% | balance |
| Magenta pigment dispersion 23 | 2% | | | | Pigment dispersing resin 2 | 10% | balance |
| Magenta pigment dispersion 24 | 10% | | | | Pigment dispersing resin 2 | 10% | balance |
| Magenta pigment dispersion 25 | 18% | | | | Pigment dispersing resin 2 | 10% | balance |
| Magenta pigment dispersion 26 | 2% | | | | Pigment dispersing resin 2 | 10% | balance |
| Magenta pigment dispersion 27 | 10% | | | | Pigment dispersing resin 2 | 10% | balance |
| Magenta pigment dispersion 28 | 18% | | | | Pigment dispersing resin 2 | 10% | balance |
| Magenta pigment dispersion 29 | | | | | Pigment dispersing resin 2 | 10% | balance |
| Magenta pigment dispersion 30 | | | | | Pigment dispersing resin 2 | 10% | balance |
| Magenta pigment dispersion 31 | | | | | Pigment dispersing resin 2 | 10% | balance |
| Magenta pigment dispersion 32 | | | | | Pigment dispersing resin 2 | 10% | balance |
| Magenta pigment dispersion 33 | | | | | Pigment dispersing resin 2 | 10% | balance |
| Magenta pigment dispersion 34 | | | | | Pigment dispersing resin 2 | 10% | balance |

TABLE 2-continued

| | | | | | | |
|---|---|---|---|---|---|---|
| Magenta pigment dispersion 35 | 9% | | | Pigment dispersing resin 2 | 10% | balance |
| Magenta pigment dispersion 36 | 4% | | | Pigment dispersing resin 2 | 10% | balance |
| Magenta pigment dispersion 37 | 9% | | | Pigment dispersing resin 2 | 10% | balance |
| Magenta pigment dispersion 38 | 4% | | | Pigment dispersing resin 2 | 10% | balance |
| Magenta pigment dispersion 39 | 9% | | | Pigment dispersing resin 2 | 10% | balance |
| Magenta pigment dispersion 40 | 4% | | | Pigment dispersing resin 2 | 10% | balance |
| Magenta pigment dispersion 41 | 9% | | | Pigment dispersing resin 2 | 10% | balance |
| Magenta pigment dispersion 42 | 4% | | | Pigment dispersing resin 2 | 10% | balance |
| Magenta pigment dispersion 43 | 9% | | | Pigment dispersing resin 2 | 10% | balance |
| Magenta pigment dispersion 44 | 4% | | | Pigment dispersing resin 2 | 10% | balance |
| Magenta pigment dispersion 45 | 9% | | | Pigment dispersing resin 2 | 10% | balance |
| Magenta pigment dispersion 46 | 4% | | | Pigment dispersing resin 2 | 10% | balance |
| Magenta pigment dispersion 47 | | 9% | | Pigment dispersing resin 2 | 10% | balance |
| Magenta pigment dispersion 48 | | 4% | | Pigment dispersing resin 2 | 10% | balance |
| Magenta pigment dispersion 49 | | | 9% | Pigment dispersing resin 2 | 10% | balance |
| Magenta pigment dispersion 50 | | | 4% | Pigment dispersing resin 2 | 10% | balance |
| Magenta pigment dispersion 51 | 7% | 13% | | Pigment dispersing resin 2 | 10% | balance |
| Magenta pigment dispersion 52 | 10% | 10% | | Pigment dispersing resin 2 | 10% | balance |
| Magenta pigment dispersion 53 | 6% | 14% | | Pigment dispersing resin 2 | 10% | balance |
| Magenta pigment dispersion 54 | 10% | 10% | | Pigment dispersing resin 2 | 10% | balance |
| Magenta pigment dispersion 55 | 6% | | 14% | Pigment dispersing resin 2 | 10% | balance |
| Magenta pigment dispersion 56 | 10% | | 10% | Pigment dispersing resin 2 | 10% | balance |
| Magenta pigment dispersion 57 | | | | Pigment dispersing resin 2 | 8% | balance |
| Magenta pigment dispersion 58 | | | | Pigment dispersing resin 2 | 6% | balance |
| Magenta pigment dispersion 59 | | | | Pigment dispersing resin 2 | 2% | balance |
| Magenta pigment dispersion 60 | | | | Pigment dispersing resin 2 | 1% | balance |

The abbreviations used in Table 2 have the following meanings.

P.R.150: C.I. Pigment Red 150
P.R.31: C.I. Pigment Red 31
P.R. 146: C.I. Pigment Red 146
P.R.147: C.I. Pigment Red 147
P.R.266: C.I. Pigment Red 266
P.R.269: C.I. Pigment Red 269
P.R.1: C.I. Pigment Red 1
P.R. 166: C.I. Pigment Red 166
P.R.242: C.I. Pigment Red 242
P.R.48:3: C.I. Pigment Red 48:3
P.R. 122: C.I. Pigment Red 122
P.R.202: C.I. Pigment Red 202
P.R.209: C.I. Pigment Red 209

<Production Example for Cyan Pigment Dispersion 1>

Twenty parts of C.I. Pigment Blue 15:3 as a pigment, 10 parts of the aqueous solution of the pigment dispersing resin 2 and 70 parts of water were mixed, and following preliminary dispersion using a Disper, a Dyno Mill with a capacity of 0.6 L filled with 1,800 g of zirconia beads having a diameter of 0.5 mm was used to perform the main dispersion, thus obtaining a cyan pigment dispersion 1.

<Production Example for Yellow Pigment Dispersion 1>

Twenty parts of C.I. Pigment Yellow 74 as a pigment, 10 parts of the aqueous solution of the pigment dispersing resin 2 and 70 parts of water were mixed, and following preliminary dispersion using a Disper, a Dyno Mill with a capacity of 0.6 L filled with 1,800 g of zirconia beads having a diameter of 0.5 mm was used to perform the main dispersion, thus obtaining a yellow pigment dispersion 1.

<Production Example for Yellow Pigment Dispersion 2>

Twenty parts of C.I. Pigment Yellow 14 as a pigment, 10 parts of the aqueous solution of the pigment dispersing resin 2 and 70 parts of water were mixed, and following preliminary dispersion using a Disper, a Dyno Mill with a capacity of 0.6 L filled with 1,800 g of zirconia beads having a diameter of 0.5 mm was used to perform the main dispersion, thus obtaining a yellow pigment dispersion 2.

<Production Example for Yellow Pigment Dispersion 3>

Twenty parts of C.I. Pigment Yellow 180 as a pigment, 10 parts of the aqueous solution of the pigment dispersing resin 2 and 70 parts of water were mixed, and following preliminary dispersion using a Disper, a Dyno Mill with a capacity of 0.6 L filled with 1,800 g of zirconia beads having a diameter of 0.5 mm was used to perform the main dispersion, thus obtaining a yellow pigment dispersion 3.

<Magenta Inks>
<Production Example for Magenta Ink 1 (M1) of Example 1>

A mixture was prepared containing 20 parts of the magenta pigment dispersion 1, 25 parts of 1,2-butanediol, 10 parts of the binder resin 1, 1 part of the polyether-modified siloxane 2, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a magenta ink (M1) of Example 1.

<Production Examples for Magenta Inks (M2 to M101) of Examples 2 to 101>

Using the raw materials shown in Tables 3 to 8, magenta inks (M2 to M101) of Examples 2 to 101 were produced in a similar manner to the production example for the magenta ink of Example 1.

TABLE 3

| | | | Example 1 (M1) | Example 2 (M2) | Example 3 (M3) | Example 4 (M4) | Example 5 (M5) | Example 6 (M6) | Example 7 (M7) | Example 8 (M8) | Example 9 (M9) |
|---|---|---|---|---|---|---|---|---|---|---|---|
| Pigment dispersion | Magenta pigment dispersion (pigment concentration = 20%) | type amount | MB2 20% | MB2 20% | MB2 20% | MB2 20% | MB2 20% | MB2 20% | MB2 20% | MB2 20% | MB2 20% |
| Water-soluble organic solvent (A) | Water-soluble organic solvent (A-1) | 1,2-BD [boiling point: 191° C., surface tension: 31.6 mN/m] | HLB: 7.6 | 25% | | | | | | | |
| | | 1,2-PenD [boiling point: 206° C., surface tension: 27.7 mN/m] | HLB: 6.5 | | 25% | | | | | | | |
| | | 1,2-HexD [boiling point: 224° C., surface tension: 26.4 mN/m] | HLB: 5.8 | | | 25% | | | | | | 5% |
| | | DPM [boiling point: 190° C., surface tension: 28.6 mN/m] | HLB: 2.3 | | | | 25% | | | | | |
| | | MB [boiling point: 157° C., surface tension: 29.3 mN/m] | HLB: 6.3 | | | | | 25% | | | | |
| | | PGM [boiling point: 120° C., surface tension: 26.7 mN/m] | HLB: 3.8 | | | | | | 25% | | | |
| | Solvent other than water-soluble organic solvent (A-1) | 1,2-PD [boiling point: 188° C., surface tension: 35.1 mN/m] | HLB: 8.9 | | | | | | | | | |
| | | 1,4-BD [boiling point: 230° C., surface tension: 43.3 mN/m] | HLB: 7.6 | | | | | | | | | |
| | | DPDM [boiling point: 175° C., surface tension: 25.9 mN/m] | HLB: 0.0 | | | | | | | | | |
| | | DPMP [boiling point: 212° C., surface tension: 25.6 mN/m] | HLB: 1.9 | | | | | | | | | |
| | | BDG [boiling point: 230° C., surface tension: 27.9 mN/m] | HLB: 13.0 | | | | | | | | | |
| | | GLY [boiling point: 290° C., surface tension: 62.3 mN/m] | HLB: 11.1 | | | | | | | | | |
| Surfactant (B) | Surfactant (B-1) | Acetylenediol 1 | HLB: 2.7 | | | | | | | | | |
| | | Acetylenediol 1 | HLB: 3.0 | | | | | | | | | |
| | | Surfynol 440 | HLB: 8.0 | | | | | | | | | |
| | | Polyether-modified siloxane 1 | HLB: 7.6 | 1% | 1% | 1% | 1% | 1% | 1% | | | |
| | | Polyether-modified siloxane 2 | HLB: 4.6 | | | | | | | | | |
| | | Polyether-modified siloxane 3 | HLB: 7.5 | | | | | | | 1% | | |
| | | Polyether-modified siloxane 4 | HLB: 1.9 | | | | | | | | | |
| | | Polyether-modified siloxane 5 | HLB: 9.2 | | | | | | | | 1% | |
| | other than surfactant (B-1) | Polyether-modified siloxane 6 | HLB: 1.2 | | | | | | | | | 1% |
| | | Surfynol 465 | HLB: 13.0 | | | | | | | | | |
| Binder resin | | Water-soluble resin 1 (solid fraction = 40%) | | 10% | 10% | 10% | 10% | 10% | 10% | 10% | 10% | 10% |
| Water | | | | balance | balance | balance | balance | balance | balance | balance | balance | balance |
| Evaluations | | Ink storage stability | | AA | AA | A | B | B | B | AA | AA | AA |
| | | Ink dynamic surface tension | | A | A | A | B | B | B | B | A | A |
| | | Printed item spectral reflectance | | A | A | A | A | A | A | A | A | A |
| | | Printed item density irregularities | | B | B | B | B | B | B | B | B | A |
| | | Printed item voids | | A | A | B | B | B | B | B | B | A |
| | | Printed item gloss | | B | B | A | B | B | B | B | B | B |
| | | Printed item density | | B | A | B | B | A | A | B | A | A |
| | | Printed item drying properties | | B | A | B | B | B | B | AA | A | A |
| | | Discharge stability | | AA | A | A | B | B | B | AA | B | B |

TABLE 3-continued

| | | | Example 10 (M10) | Example 11 (M11) | Example 12 (M12) | Example 13 (M13) | Example 14 (M14) | Example 15 (M15) | Example 16 (M16) | Example 17 (M17) | Example 18 (M18) |
|---|---|---|---|---|---|---|---|---|---|---|---|
| Pigment dispersion | Magenta pigment dispersion (pigment concentration = 20%) | type amount | MB2 20% | MB2 20% | MB2 20% | MB2 20% | MB2 20% | MB2 20% | MB2 20% | MB2 20% | MB2 20% |
| Water-soluble organic solvent (A) | Water-soluble organic solvent (A-1) | 1,2-BD [boiling point: 191° C., surface tension: 31.6 mN/m] HLB: 7.6 | 20% | 20% | 20% | 20% | 20% | 20% | 20% | 20% | 20% |
| | | 1,2-PenD [boiling point: 206° C., surface tension: 27.7 mN/m] HLB: 6.5 | 5% | 5% | 5% | 5% | 5% | | | | |
| | | 1,2-HexD [boiling point: 224° C., surface tension: 26.4 mN/m] HLB: 5.8 | | | | | | 5% | | | |
| | | DPM [boiling point: 190° C., surface tension: 28.6 mN/m] HLB: 2.3 | | | | | | | 5% | | |
| | | MB [boiling point: 157° C., surface tension: 29.3 mN/m] HLB: 6.3 | | | | | | | | 5% | |
| | | PGM [boiling point: 120° C., surface tension: 26.7 mN/m] HLB: 3.8 | | | | | | | | | 5% |
| | Solvent other than water-soluble organic solvent (A-1) | 1,2-PD [boiling point: 188° C., surface tension: 35.1 mN/m] HLB: 8.9 | | | | | | | | | |
| | | 1,4-BD [boiling point: 230° C., surface tension: 43.3 mN/m] HLB: 7.6 | | | | | | | | | |
| | | DPDM [boiling point: 175° C., surface tension: 25.9 mN/m] HLB: 0.0 | | | | | | | | | |
| | | DPMP [boiling point: 212° C., surface tension: 25.6 mN/m] HLB: 1.9 | | | | | | | | | |
| | | BDG [boiling point: 230° C., surface tension: 27.9 mN/m] HLB: 13.0 | | | | | | | | | |
| | | GLY [boiling point: 290° C., surface tension: 62.3 mN/m] HLB: 11.1 | | | | | | | | | |
| Surfactant (B) | Surfactant (B-1) | Acetylenediol 1 HLB: 2.7 | 1% | | | | | | | | |
| | | Acetylenediol 1 HLB: 3.0 | | 1% | | | | | | | |
| | | Surfynol 440 HLB: 8.0 | | | 1% | | | | | | |
| | | Polyether-modified siloxane 1 HLB: 7.6 | | | | 1% | | | | | |
| | | Polyether-modified siloxane 2 HLB: 4.6 | | | | | 1% | | | | |
| | | Polyether-modified siloxane 3 HLB: 7.5 | | | | | | 1% | | | |
| | | Polyether-modified siloxane 4 HLB: 1.9 | | | | | | | 1% | | |
| | | Polyether-modified siloxane 5 HLB: 9.2 | | | | | | | | 1% | |
| | other than surfactant (B-1) | Polyether-modified siloxane 6 HLB: 1.2 | | | | | | | | | 1% |
| | | Surfynol 465 HLB: 13.0 | | | | | | | | | |
| Binder resin | Water-soluble resin 1 (solid fraction = 40%) | | 10% | 10% | 10% | 10% | 10% | 10% | 10% | 10% | 10% |
| Water | | | balance | balance | balance | balance | balance | balance | balance | balance | balance |
| Evaluations | Ink storage stability | | AA | AA | AA | AA | AA | A | AA | AA | AA |
| | Ink dynamic surface tension | | A | A | A | A | A | A | A | A | A |
| | Printed item spectral reflectance | | A | A | A | A | A | A | A | A | A |
| | Printed item density irregularities | | A | A | B | A | B | B | B | B | B |
| | Printed item voids | | A | B | B | B | B | B | B | B | B |
| | Printed item gloss | | B | B | B | B | B | B | B | B | B |
| | Printed item density | | A | A | A | A | A | A | A | A | A |
| | Printed item drying properties | | B | A | A | A | A | A | A | A | A |
| | Discharge stability | | AA | AA | AA | AA | AA | AA | AA | AA | AA |

TABLE 4

| | | | Example 19 (M19) | Example 20 (M20) | Example 21 (M21) | Example 22 (M22) | Example 23 (M23) | Example 24 (M24) | Example 25 (M25) | Example 26 (M26) | Example 27 (M27) |
|---|---|---|---|---|---|---|---|---|---|---|---|
| Pigment dispersion | Magenta pigment dispersion (pigment concentration = 20%) | type amount | MB2 20% | MB2 20% | MB2 20% | MB2 20% | MB2 20% | MB2 20% | MB2 20% | MB2 20% | MB2 20% |
| Water-soluble organic solvent (A) | Water-soluble organic solvent (A-1) | 1,2-BD [boiling point: 191° C., surface tension: 31.6 mN/m] HLB: 7.6 | 20% | 20% | 20% | 20% | 20% | 20% | 20% | 3% | 10% |
| | | 1,2-PenD [boiling point: 206° C., surface tension: 27.7 mN/m] HLB: 6.5 | | | | | | | | | |
| | | 1,2-HexD [boiling point: 224° C., surface tension: 26.4 mN/m] HLB: 5.8 | 5% | 5% | 5% | 5% | 5% | 5% | 5% | 5% | 5% |
| | | DPM [boiling point: 190° C., surface tension: 28.6 mN/m] HLB: 2.3 | | | | | | | | | |
| | | MB [boiling point: 157° C., surface tension: 29.3 mN/m] HLB: 6.3 | | | | | | | | | |
| | | PGM [boiling point: 120° C., surface tension: 26.7 mN/m] HLB: 3.8 | | | | | | | | | |
| | Solvent other than water-soluble organic solvent (A-1) | 1,2-PD [boiling point: 188° C., surface tension: 35.1 mN/m] HLB: 8.9 | | | | | | | | | |
| | | 1,4-BD [boiling point: 230° C., surface tension: 43.3 mN/m] HLB: 7.6 | | | | | | | | | |
| | | DPDM [boiling point: 175° C., surface tension: 25.9 mN/m] HLB: 0.0 | | | | | | | | | |
| | | DPMP [boiling point: 212° C., surface tension: 25.6 mN/m] HLB: 1.9 | | | | | | | | | |
| | | BDG [boiling point: 230° C., surface tension: 27.9 mN/m] HLB: 13.0 | | | | | | | | | |
| | | GLY [boiling point: 290° C., surface tension: 62.3 mN/m] HLB: 11.1 | | | | | | | | | |
| Surfactant (B) | Surfactant (B-1) | Acetylenediol 1 HLB: 2.7 | 1% | | | | | | | | |
| | | Acetylenediol 1 HLB: 3.0 | | 1% | | | | | | | |
| | | Surfynol 440 HLB: 8.0 | | | 1% | | | | | | |
| | | Polyether-modified siloxane 1 HLB: 7.6 | | | | 1% | | | | | |
| | | Polyether-modified siloxane 2 HLB: 4.6 | | | | | 1% | | | | |
| | | Polyether-modified siloxane 3 HLB: 7.5 | | | | | | 1% | | | |
| | other than surfactant (B-1) | Polyether-modified siloxane 4 HLB: 1.9 | 1% | 1% | 1% | 1% | 1% | | 1% | 1% | 1% |
| | | Polyether-modified siloxane 5 HLB: 9.2 | | | | | | | 1% | | |
| | | Polyether-modified siloxane 6 HLB: 1.2 | | | | | | | | 1% | 1% |
| | | Surfynol 465 HLB: 13.0 | | | | | | | | | |

TABLE 4-continued

| | | | Example 28 (M28) | Example 29 (M29) | Example 30 (M30) | Example 31 (M31) | Example 32 (M32) | Example 33 (M33) | Example 34 (M34) | Example 35 (M35) | Example 36 (M36) |
|---|---|---|---|---|---|---|---|---|---|---|---|
| Binder resin | Water-soluble resin 1 (solid fraction = 40%) | | 10% | 10% | 10% | 10% | 10% | 10% | 10% | 10% | 10% |
| Water | | | balance | balance | balance | balance | balance | balance | balance | balance | balance |
| Evaluations | Ink storage stability | | AA | AA | AA | AA | AA | AA | AA | AA | AA |
| | Ink dynamic surface tension | | A | A | A | A | A | A | A | B | A |
| | Printed item spectral reflectance | | A | A | A | A | A | A | A | A | A |
| | Printed item density irregularities | | A | A | A | A | A | A | A | A | A |
| | Printed item voids | | A | A | A | A | A | A | A | B | A |
| | Printed item gloss | | A | A | B | B | B | A | B | B | B |
| | Printed item density | | AA | A | A | A | B | B | B | A | A |
| | Printed item drying properties | | AA | AA | AA | AA | A | AA | AA | AA | AA |
| | Discharge stability | | AA | AA | AA | AA | A | AA | AA | B | A |
| Pigment dispersion | Magenta pigment dispersion (pigment concentration = 20%) | type | MB2 | MB2 | MB2 | MB2 | MB2 | MB2 | MB2 | MB2 | MB2 |
| | | amount | 20% | 20% | 20% | 20% | 20% | 20% | 20% | 20% | 20% |
| Water-soluble organic solvent (A) | Water-soluble organic solvent (A-1) | 1,2-BD [boiling point: 191° C., surface tension: 31.6 mN/m] | HLB: 7.6 | 35% | 40% | 20% | 20% | 20% | 20% | 20% | 20% | 20% |
| | | 1,2-PenD [boiling point: 206° C., surface tension: 27.7 mN/m] | HLB: 6.5 | | | | | | | | | |
| | | 1,2-HexD [boiling point: 224° C., surface tension: 26.4 mN/m] | HLB: 5.8 | 5% | | | | | | | 15% | 15% |
| | | DPM [boiling point: 190° C., surface tension: 28.6 mN/m] | HLB: 2.3 | | | 5% | | | | | | |
| | | MB [boiling point: 157° C., surface tension: 29.3 mN/m] | HLB: 6.3 | | | | 5% | | | | | |
| | | PGM [boiling point: 120° C., surface tension: 26.7 mN/m] | HLB: 3.8 | | | | | 5% | | | | |
| | Solvent other than water-soluble organic solvent (A-1) | 1,2-PD [boiling point: 188° C., surface tension: 35.1 mN/m] | HLB: 8.9 | | | | | | | | | 5% |
| | | 1,4-BD [boiling point: 230° C., surface tension: 43.3 mN/m] | HLB: 7.6 | | | | | | 5% | | | |
| | | DPDM [boiling point: 175° C., surface tension: 25.9 mN/m] | HLB: 0.0 | | | | | | | 5% | | |
| | | DPMP [boiling point: 212° C., surface tension: 25.6 mN/m] | HLB: 1.9 | | | | | | | | | |
| | | BDG [boiling point: 230° C., surface tension: 27.9 mN/m] | HLB: 13.0 | | | | | | | | | |
| | | GLY [boiling point: 290° C., surface tension: 62.3 mN/m] | HLB: 11.1 | | | | | | | | | |

TABLE 4-continued

| | | | C1 | C2 | C3 | C4 | C5 | C6 | C7 | C8 | C9 | C10 |
|---|---|---|---|---|---|---|---|---|---|---|---|---|
| Surfactant (B) | Surfactant (B-1) | Acetylenediol 1 HLB: 2.7 | | | | | | | | | | |
| | | Acetylenediol 1 HLB: 3.0 | 1% | | | | | | | | | |
| | | Surfynol 440 HLB: 8.0 | | | | | | | | | | |
| | | Polyether-modified siloxane 1 HLB: 7.6 | | 1% | | | | | | | | |
| | | Polyether-modified siloxane 2 HLB: 4.6 | | | 1% | | | | | | | |
| | | Polyether-modified siloxane 3 HLB: 7.5 | | | | 1% | | | | | | |
| | | Polyether-modified siloxane 4 HLB: 1.9 | | | | | 1% | | | | | |
| | other than surfactant (B-1) | Polyether-modified siloxane 5 HLB: 9.2 | | | | | | 1% | | | | |
| | | Polyether-modified siloxane 6 HLB: 1.2 | | | | | | | 1% | 1% | | |
| | | Surfynol 465 HLB: 13.0 | | | | | | | | | 1% | 1% |
| Binder resin | | Water-soluble resin 1 (solid fraction = 40%) | 10% balance | 10% balance | 10% balance | 10% balance | 10% balance | 10% balance | 10% balance | 10% balance | 10% balance | 10% balance |
| Water Evaluations | | Ink storage stability | AA | A | A | AA | AA | AA | AA | AA | A | A |
| | | Ink dynamic surface tension | A | A | A | A | A | A | A | A | A | A |
| | | Printed item spectral reflectance | B | A | B | AA | A | A | A | B | A | A |
| | | Printed item density irregularities | B | A | A | A | AA | A | A | B | A | A |
| | | Printed item voids | A | A | A | AA | A | A | A | B | A | A |
| | | Printed item gloss | A | A | A | AA | A | A | A | B | A | A |
| | | Printed item density | A | AA | AA | AA | AA | AA | AA | B | AA | B |
| | | Printed item drying properties | A | A | AA | AA | AA | AA | AA | A | AA | A |
| | | Discharge stability | A | B | A | AA | A | A | A | AA | A | A |

TABLE 5

| | | | Example 37 (M37) | Example 38 (M38) | Example 39 (M39) | Example 40 (M40) | Example 41 (M41) | Example 42 (M42) | Example 43 (M43) | Example 44 (M44) | Example 45 (M45) |
|---|---|---|---|---|---|---|---|---|---|---|---|
| Pigment dispersion | Magenta pigment dispersion (pigment concentration = 20%) | type amount | MB2 20% | MB2 5% | MB2 15% | MB2 30% | MB2 40% | MB2 50% | MB1 20% | MB3 20% | MB4 20% |
| Water-soluble organic solvent (A) | Water-soluble organic solvent (A-1) | 1,2-BD [boiling point: 191° C., surface tension: 31.6 mN/m] | HLB: 7.6 20% | HLB: 7.6 15% | HLB: 7.6 15% | HLB: 7.6 15% | HLB: 7.6 15% | HLB: 7.6 15% | HLB: 7.6 20% | HLB: 7.6 20% | HLB: 7.6 20% |
| | | 1,2-PenD [boiling point: 206° C., surface tension: 27.7 mN/m] | HLB: 6.5 | | | | | | | | |
| | | 1,2-HexD [boiling point: 224° C., surface tension: 26.4 mN/m] | HLB: 5.8 5% | HLB: 5.8 15% | HLB: 5.8 15% | HLB: 5.8 15% | HLB: 5.8 15% | HLB: 5.8 15% | HLB: 5.8 5% | HLB: 5.8 5% | HLB: 5.8 5% |
| | | DPM [boiling point: 190° C., surface tension: 28.6 mN/m] | HLB: 2.3 | | | | | | | | |
| | | MB [boiling point: 157° C., surface tension: 29.3 mN/m] | HLB: 6.3 | | | | | | | | |
| | | PGM [boiling point: 120° C., surface tension: 26.7 mN/m] | HLB: 3.8 15% | | | | | | | | |
| | Solvent other than water-soluble organic solvent (A-1) | 1,2-PD [boiling point: 188° C., surface tension: 35.1 mN/m] | HLB: 8.9 | | | | | | | | |
| | | 1,4-BD [boiling point: 230° C., surface tension: 43.3 mN/m] | HLB: 7.6 | | | | | | | | |
| | | DPDM [boiling point: 175° C., surface tension: 25.9 mN/m] | HLB: 0.0 | | | | | | | | |
| | | DPMP [boiling point: 212° C., surface tension: 25.6 mN/m] | HLB: 1.9 | | | | | | | | |
| | | BDG [boiling point: 230° C., surface tension: 27.9 mN/m] | HLB: 13.0 | | | | | | | | |
| | | GLY [boiling point: 290° C., surface tension: 62.3 mN/m] | HLB: 11.1 | | | | | | | | |

TABLE 5-continued

| | | | Example 46 (M46) | Example 47 (M47) | Example 48 (M48) | Example 49 (M49) | Example 50 (M50) | Example 51 (M51) | Example 52 (M52) | Example 53 (M53) | Example 54 (M54) | Example 55 (M55) |
|---|---|---|---|---|---|---|---|---|---|---|---|---|
| Pigment dispersion | Magenta pigment dispersion (pigment concentration = 20%) | type | MB5 | MB6 | MB7 | MB8 | MB9 | MB10 | MB12 | MB13 | MB11 | MB14 |
| | | amount | 20% | 20% | 20% | 20% | 20% | 20% | 20% | 20% | 20% | 20% |
| Water-soluble organic solvent (A) | Water-soluble organic solvent (A-1) | 1,2-BD [boiling point: 191° C., surface tension: 31.6 mN/m] HLB: 7.6 | 20% | 20% | 20% | 20% | 20% | 20% | 20% | 20% | 20% | 20% |
| | | 1,2-PenD [boiling point: 206° C., surface tension: 27.7 mN/m] HLB: 6.5 | | | | | | | | | | |
| | | 1,2-HexD [boiling point: 224° C., surface tension: 26.4 mN/m] HLB: 5.8 | 5% | 5% | 5% | 5% | 5% | 5% | 5% | 5% | 5% | 5% |
| | | DPM [boiling point: 190° C., surface tension: 28.6 mN/m] HLB: 2.3 | | | | | | | | | | |
| | | MB [boiling point: 157° C., surface tension: 29.3 mN/m] HLB: 6.3 | | | | | | | | | | |
| | | PGM [boiling point: 120° C., surface tension: 26.7 mN/m] HLB: 3.8 | | | | | | | | | | |
| Surfactant (B) | Surfactant (B-1) | Acetylenediol 1 HLB: 2.7 | | | | | | | | | | |
| | | Acetylenediol 1 HLB: 3.0 | | | | | | | | | | |
| | | Surfynol 440 HLB: 8.0 | | | | | | | | | | |
| | | Polyether-modified siloxane 1 HLB: 7.6 | 1% | 1% | 1% | 1% | 1% | 1% | 1% | 1% | 1% | 1% |
| | | Polyether-modified siloxane 2 HLB: 4.6 | | | | | | | | | | |
| | | Polyether-modified siloxane 3 HLB: 7.5 | | | | | | | | | | |
| | | Polyether-modified siloxane 4 HLB: 1.9 | | | | | | | | | | |
| | | Polyether-modified siloxane 5 HLB: 9.2 | 1% | 1% | 1% | 1% | 1% | 1% | 1% | 1% | 1% | 1% |
| | | Polyether-modified siloxane 6 HLB: 1.2 | | | | | | | | | | |
| | other than surfactant (B-1) | Surfynol 465 HLB: 13.0 | | | | | | | | | | |
| Binder resin | Water-soluble resin 1 (solid fraction = 40%) | | 10% | 10% | 10% | 10% | 10% | 10% | 10% | 10% | 10% | 10% |
| Water | | | balance | balance | balance | balance | balance | balance | balance | balance | balance | balance |
| Evaluations | Ink storage stability | | A | A | A | A | A | A | B | B | AA | AA |
| | Ink dynamic surface tension | | A | A | A | A | A | A | A | A | A | A |
| | Printed item spectral reflectance | | A | B | B | A | A | A | A | A | A | A |
| | Printed item density irregularities | | A | A | A | A | A | A | A | A | A | A |
| | Printed item voids | | B | A | A | A | A | A | A | A | A | A |
| | Printed item gloss | | A | A | A | A | A | A | A | A | A | A |
| | Printed item density | | AA | AA | AA | AA | AA | AA | AA | AA | AA | AA |
| | Printed item drying properties | | A | A | A | A | AA | A | A | AA | AA | AA |
| | Discharge stability | | | | | | | | | B | A | B |

TABLE 5-continued

| | | | | | | | | | | | |
|---|---|---|---|---|---|---|---|---|---|---|---|
| Solvent other than water-soluble organic solvent (A-1) | 1,2-PD [boiling point: 188° C., surface tension: 35.1 mN/m] | HLB: 8.9 | | | | | | | | | |
| | 1,4-BD [boiling point: 230° C., surface tension: 43.3 mN/m] | HLB: 7.6 | | | | | | | | | |
| | DPDM [boiling point: 175° C., surface tension: 25.9 mN/m] | HLB: 0.0 | | | | | | | | | |
| | DPMP [boiling point: 212° C., surface tension: 25.6 mN/m] | HLB: 1.9 | | | | | | | | | |
| | BDG [boiling point: 230° C., surface tension: 27.9 mN/m] | HLB: 13.0 | | | | | | | | | |
| | GLY [boiling point: 290° C., surface tension: 62.3 mN/m] | HLB: 11.1 | | | | | | | | | |
| Surfactant (B) | Surfactant (B-1) | Acetylenediol 1 | HLB: 2.7 | 1% | 1% | | | | | | |
| | | Surfynol 440 | HLB: 3.0 | | | | | | | | |
| | | Polyether-modified siloxane 1 | HLB: 8.0 | | | | | | | | |
| | | Polyether-modified siloxane 2 | HLB: 7.6 | 1% | 1% | | | | | | |
| | | Polyether-modified siloxane 3 | HLB: 4.6 | | | | | | | | |
| | | Polyether-modified siloxane 4 | HLB: 7.5 | | | | | | | | |
| | | Polyether-modified siloxane 5 | HLB: 1.9 | | | | | | | | |
| | | Polyether-modified siloxane 6 | HLB: 9.2 | | | | | | | | |
| | other than surfactant (B-1) | Surfynol 465 | HLB: 1.2 | | | | | | | | 1% |
| Binder resin | Water-soluble resin 1 (solid fraction = 40%) | HLB: 13.0 | 10% | 10% | 10% | 10% | 10% | 10% | 10% | 10% | 10% |
| Water | | | balance | balance | balance | balance | balance | balance | balance | balance | balance |
| Evaluations | Ink storage stability | | A | B | AA | AA | AA | AA | A | A | A |
| | Ink dynamic surface tension | | A | A | A | A | A | A | B | A | A |
| | Printed item spectral reflectance | | A | A | A | A | A | A | A | B | B |
| | Printed item density irregularities | | A | A | A | A | A | B | A | A | A |
| | Printed item voids | | A | A | A | A | A | A | A | A | A |
| | Printed item gloss | | A | A | A | A | A | A | B | A | A |
| | Printed item density | | AA | AA | AA | AA | AA | AA | AA | AA | AA |
| | Printed item drying properties | | A | B | A | A | A | B | A | A | A |
| | Discharge stability | | A | A | A | A | A | A | A | A | A |

TABLE 6

| | | | Example 56 (M56) | Example 57 (M57) | Example 58 (M58) | Example 59 (M59) | Example 60 (M60) | Example 61 (M61) | Example 62 (M62) | Example 63 (M63) | Example 64 (M64) |
|---|---|---|---|---|---|---|---|---|---|---|---|
| Pigment dispersion | Magenta pigment dispersion (pigment concentration = 20%) | type amount | MB16 20% | MB17 20% | MB18 19% | MB19 18% | MB20 19% | MB21 18% | MB22 18% | MB23 20% | MB24 19% |
| Water-soluble organic solvent (A) | Water-soluble organic solvent (A-1) | 1,2-BD [boiling point: 191° C., surface tension: 31.6 mN/m] | HLB: 7.6 | 20% | 20% | 20% | 20% | 20% | 20% | 20% | 20% |
| | | 1,2-PenD [boiling point: 206° C., surface tension: 27.7 mN/m] | HLB: 6.5 | | | | | | | | |
| | | 1,2-HexD [boiling point: 224° C., surface tension: 26.4 mN/m] | HLB: 5.8 | 5% | 5% | 5% | 5% | 5% | 5% | 5% | 5% | 5% |
| | | DPM [boiling point: 190° C., surface tension: 28.6 mN/m] | HLB: 2.3 | | | | | | | | | |
| | | MB [boiling point: 157° C., surface tension: 29.3 mN/m] | HLB: 6.3 | | | | | | | | | |
| | | PGM [boiling point: 120° C., surface tension: 26.7 mN/m] | HLB: 3.8 | | | | | | | | | |
| | Solvent other than water-soluble organic solvent (A-1) | 1,2-PD [boiling point: 188° C., surface tension: 35.1 mN/m] | HLB: 8.9 | | | | | | | | | |
| | | 1,4-BD [boiling point: 230° C., surface tension: 43.3 mN/m] | HLB: 7.6 | | | | | | | | | |
| | | DPDM [boiling point: 175° C., surface tension: 25.9 mN/m] | HLB: 0.0 | | | | | | | | | |
| | | DPMP [boiling point: 212° C., surface tension: 25.6 mN/m] | HLB: 1.9 | | | | | | | | | |
| | | BDG [boiling point: 230° C., surface tension: 27.9 mN/m] | HLB: 13.0 | | | | | | | | | |
| | | GLY [boiling point: 290° C., surface tension: 62.3 mN/m] | HLB: 11.1 | | | | | | | | | |
| Surfactant (B) | Surfactant (B-1) | Acetylenediol 1 | HLB: 2.7 | 1% | 1% | 1% | 1% | 1% | 1% | 1% | 1% | 1% |
| | | Acetylenediol 1 | HLB: 3.0 | | | | | | | | | |
| | | Surfynol 440 | HLB: 8.0 | | | | | | | | | |
| | | Polyether-modified siloxane 1 | HLB: 7.6 | | | | | | | | | |
| | | Polyether-modified siloxane 2 | HLB: 4.6 | | | | | | | | | |
| | | Polyether-modified siloxane 3 | HLB: 7.5 | | | | | | | | | |
| | other than surfactant (B-1) | Polyether-modified siloxane 4 | HLB: 1.9 | 1% | 1% | 1% | 1% | 1% | 1% | 1% | 1% | 1% |
| | | Polyether-modified siloxane 5 | HLB: 9.2 | | | | | | | | | |
| | | Polyether-modified siloxane 6 | HLB: 1.2 | | | | | | | | | |
| | | Surfynol 465 | HLB: 13.0 | | | | | | | | | |

TABLE 6-continued

| Binder resin | Water-soluble resin 1 (solid fraction = 40%) | | | Example 65 (M65) | Example 66 (M66) | Example 67 (M67) | Example 68 (M68) | Example 69 (M69) | Example 70 (M70) | Example 71 (M71) | Example 72 (M72) | Example 73 (M73) |
|---|---|---|---|---|---|---|---|---|---|---|---|---|
| Water Evaluations | | | | 10% balance | 10% balance | 10% balance | 10% balance | 10% balance | 10% balance | 10% balance | 10% balance | 10% balance |
| | Ink storage stability | | | A | A | A | AA | A | AA | AA | A | A |
| | Ink dynamic surface tension | | | A | A | A | A | A | A | A | A | A |
| | Printed item spectral reflectance | | | A | A | A | A | A | A | A | A | A |
| | Printed item density irregularities | | | A | A | A | A | A | A | A | A | A |
| | Printed item voids | | | A | A | A | A | A | A | A | A | A |
| | Printed item gloss | | | AA | A | A | AA | A | AA | AA | A | A |
| | Printed item density | | | AA | A | A | AA | A | AA | AA | A | A |
| | Printed item drying properties | | | A | A | A | A | A | A | A | A | A |
| | Discharge stability | | | A | A | A | A | A | A | A | A | A |

| | | | | Example 65 (M65) | Example 66 (M66) | Example 67 (M67) | Example 68 (M68) | Example 69 (M69) | Example 70 (M70) | Example 71 (M71) | Example 72 (M72) | Example 73 (M73) |
|---|---|---|---|---|---|---|---|---|---|---|---|---|
| Pigment dispersion | Magenta pigment dispersion (pigment concentration = 20%) | type amount | | MB25 18% 20% | MB26 18% 20% | MB27 20% 20% | MB28 20% 20% | MB29 18% 20% | MB30 18% 20% | MB31 18% 20% | MB32 18% 20% | MB33 18% 20% |
| Water-soluble organic solvent (A) | Water-soluble organic solvent (A-1) | 1,2-BD [boiling point: 191° C., surface tension: 31.6 mN/m] | HLB: 7.6 | | | | | | | | | |
| | | 1,2-PenD [boiling point: 206° C., surface tension: 27.7 mN/m] | HLB: 6.5 | | | | | | | | | |
| | | 1,2-HexD [boiling point: 224° C., surface tension: 26.4 mN/m] | HLB: 5.8 | 5% | 5% | 5% | 5% | 5% | 5% | 5% | 5% | 5% |
| | | DPM [boiling point: 190° C., surface tension: 28.6 mN/m] | HLB: 2.3 | | | | | | | | | |
| | | MB [boiling point: 157° C., surface tension: 29.3 mN/m] | HLB: 6.3 | | | | | | | | | |
| | | PGM [boiling point: 120° C., surface tension: 26.7 mN/m] | HLB: 3.8 | | | | | | | | | |
| | Solvent other than water-soluble organic solvent (A-1) | 1,2-PD [boiling point: 188° C., surface tension: 35.1 mN/m] | HLB: 8.9 | | | | | | | | | |
| | | 1,4-BD [boiling point: 230° C., surface tension: 43.3 mN/m] | HLB: 7.6 | | | | | | | | | |
| | | DPDM [boiling point: 175° C., surface tension: 25.9 mN/m] | HLB: 0.0 | | | | | | | | | |
| | | DPMP [boiling point: 212° C., surface tension: 25.6 mN/m] | HLB: 1.9 | | | | | | | | | |
| | | BDG [boiling point: 230° C., surface tension: 27.9 mN/m] | HLB: 13.0 | | | | | | | | | |
| | | GLY [boiling point: 290° C., surface tension: 62.3 mN/m] | HLB: 11.1 | | | | | | | | | |

TABLE 6-continued

| | | | | | | | | | | | | |
|---|---|---|---|---|---|---|---|---|---|---|---|---|
| Surfactant (B) | Surfactant (B-1) | Acetylenediol 1 | HLB: 2.7 | | | | | | | | | |
| | | Acetylenediol 1 | HLB: 3.0 | 1% | 1% | 1% | 1% | 1% | 1% | 1% | 1% | 1% |
| | | Surfynol 440 | HLB: 8.0 | | | | | | | | | |
| | | Polyether-modified siloxane 1 | HLB: 7.6 | 1% | 1% | | | | | | | |
| | | Polyether-modified siloxane 2 | HLB: 4.6 | | | | | | | | | |
| | | Polyether-modified siloxane 3 | HLB: 7.5 | | | | | | | | | |
| | | Polyether-modified siloxane 4 | HLB: 1.9 | | | | | | | | | |
| | | Polyether-modified siloxane 5 | HLB: 9.2 | | | | | | | | | |
| | | Polyether-modified siloxane 6 | HLB: 1.2 | | | | | | | | | |
| | other than surfactant (B-1) | Surfynol 465 | HLB: 13.0 | | | | | | | | | |
| Binder resin | | Water-soluble resin 1 (solid fraction = 40%) | | 10% balance | 10% balance | 10% balance | 10% balance | 10% balance | 10% balance | 10% balance | 10% balance | 10% balance |
| Water | | | | balance | balance | balance | balance | balance | balance | balance | balance | balance |
| Evaluations | | Ink storage stability | | A | A | A | A | A | A | AA | AA | AA |
| | | Ink dynamic surface tension | | A | A | A | A | A | A | A | A | A |
| | | Printed item spectral reflectance | | A | A | A | A | A | A | A | A | A |
| | | Printed item density irregularities | | A | A | A | A | A | A | A | A | A |
| | | Printed item voids | | A | A | A | A | A | A | A | A | A |
| | | Printed item gloss | | A | A | A | A | A | A | A | A | A |
| | | Printed item density | | A | A | A | A | A | A | A | A | A |
| | | Printed item drying properties | | AA | AA | AA | AA | AA | AA | AA | AA | AA |
| | | Discharge stability | | A | A | A | A | A | A | AA | AA | AA |

TABLE 7

| | | | Example 74 (M74) | Example 75 (M75) | Example 76 (M76) | Example 77 (M77) | Example 78 (M78) | Example 79 (M79) | Example 80 (M80) | Example 81 (M81) | Example 82 (M82) |
|---|---|---|---|---|---|---|---|---|---|---|---|
| Pigment dispersion | Magenta pigment dispersion (pigment concentration = 20%) | type amount | MB34 18% | MB35 18% | MB36 18% | MB37 18% | MB38 18% | MB39 18% | MB40 18% | MB41 18% | MB42 18% |
| Water-soluble organic solvent (A) | Water-soluble organic solvent (A-1) | 1,2-BD [boiling point: 191° C., surface tension: 31.6 mN/m] HLB: 7.6 | 20% | 20% | 20% | 20% | 20% | 20% | 20% | 20% | 20% |
| | | 1,2-PenD [boiling point: 206° C., surface tension: 27.7 mN/m] HLB: 6.5 | | | | | | | | | |
| | | 1,2-HexD [boiling point: 224° C., surface tension: 26.4 mN/m] HLB: 5.8 | 5% | 5% | 5% | 5% | 5% | 5% | 5% | 5% | 5% |
| | | DPM [boiling point: 190° C., surface tension: 28.6 mN/m] HLB: 2.3 | | | | | | | | | |
| | | MB [boiling point: 157° C., surface tension: 29.3 mN/m] HLB: 6.3 | | | | | | | | | |
| | | PGM [boiling point: 120° C., surface tension: 26.7 mN/m] HLB: 3.8 | | | | | | | | | |
| | Solvent other than water-soluble organic solvent (A-1) | 1,2-PD [boiling point: 188° C., surface tension: 35.1 mN/m] HLB: 8.9 | | | | | | | | | |
| | | 1,4-BD [boiling point: 230° C., surface tension: 43.3 mN/m] HLB: 7.6 | | | | | | | | | |
| | | DPDM [boiling point: 175° C., surface tension: 25.9 mN/m] HLB: 0.0 | | | | | | | | | |
| | | DPMP [boiling point: 212° C., surface tension: 25.6 mN/m] HLB: 1.9 | | | | | | | | | |
| | | BDG [boiling point: 230° C., surface tension: 27.9 mN/m] HLB: 13.0 | | | | | | | | | |
| | | GLY [boiling point: 290° C., surface tension: 62.3 mN/m] HLB: 11.1 | | | | | | | | | |
| Surfactant (B) | Surfactant (B-1) | Acetylenediol 1 HLB: 2.7 | | | | | | | | | |
| | | Acetylenediol 1 HLB: 3.0 | | | | | | | | | |
| | | Surfynol 440 HLB: 8.0 | | | | | | | | | |
| | | Polyether-modified siloxane 1 HLB: 7.6 | 1% | 1% | 1% | 1% | 1% | 1% | 1% | 1% | 1% |
| | | Polyether-modified siloxane 2 HLB: 4.6 | | | | | | | | | |
| | | Polyether-modified siloxane 3 HLB: 7.5 | | | | | | | | | |
| | other than surfactant (B-1) | Polyether-modified siloxane 4 HLB: 1.9 | 1% | 1% | 1% | 1% | 1% | 1% | 1% | 1% | 1% |
| | | Polyether-modified siloxane 5 HLB: 9.2 | | | | | | | | | |
| | | Polyether-modified siloxane 6 HLB: 1.2 | | | | | | | | | |
| | | Surfynol 465 HLB: 13.0 | | | | | | | | | |

TABLE 7-continued

| Binder resin | Water-soluble resin 1 (solid fraction = 40%) | | | 10% balance | 10% balance | 10% balance | 10% balance | 10% balance | 10% balance | 10% balance | 10% balance | 10% balance |
|---|---|---|---|---|---|---|---|---|---|---|---|---|
| Water Evaluations | Ink storage stability | | | AA | AA | AA | AA | AA | AA | AA | AA | AA |
| | Ink dynamic surface tension | | | A | A | A | A | A | A | A | A | A |
| | Printed item spectral reflectance | | | A | A | A | A | A | A | A | A | A |
| | Printed item density irregularities | | | A | A | A | A | A | A | A | A | A |
| | Printed item voids | | | A | A | A | A | A | A | A | A | A |
| | Printed item gloss | | | A | A | A | A | A | A | A | A | A |
| | Printed item density | | | AA | AA | AA | AA | AA | AA | AA | AA | AA |
| | Printed item drying properties | | | AA | AA | AA | AA | AA | AA | AA | AA | AA |
| | Discharge stability | | | AA | AA | AA | AA | AA | AA | AA | AA | AA |

| | | | | Example 83 (M83) | Example 84 (M84) | Example 85 (M85) | Example 86 (M86) | Example 87 (M87) | Example 88 (M88) | Example 89 (M89) | Example 90 (M90) | Example 91 (M91) |
|---|---|---|---|---|---|---|---|---|---|---|---|---|
| Pigment dispersion | Magenta pigment dispersion (pigment concentration = 20%) | | type amount | MB43 18% 20% | MB44 18% 20% | MB45 18% 20% | MB46 18% 20% | MB47 18% 20% | MB48 18% 20% | MB49 18% 20% | MB50 18% 20% | MB51 18% 20% |
| Water-soluble organic solvent (A) | Water-soluble organic solvent (A-1) | 1,2-BD [boiling point: 191° C., surface tension: 31.6 mN/m] | HLB: 7.6 | 5% | 5% | 5% | 5% | 5% | 5% | 5% | 5% | 5% |
| | | 1,2-PenD [boiling point: 206° C., surface tension: 27.7 mN/m] | HLB: 6.5 | | | | | | | | | |
| | | 1,2-HexD [boiling point: 224° C., surface tension: 26.4 mN/m] | HLB: 5.8 | | | | | | | | | |
| | | DPM [boiling point: 190° C., surface tension: 28.6 mN/m] | HLB: 2.3 | | | | | | | | | |
| | | MB [boiling point: 157° C., surface tension: 29.3 mN/m] | HLB: 6.3 | | | | | | | | | |
| | | PGM [boiling point: 120° C., surface tension: 26.7 mN/m] | HLB: 3.8 | | | | | | | | | |
| | Solvent other than water-soluble organic solvent (A-1) | 1,2-PD [boiling point: 188° C., surface tension: 35.1 mN/m] | HLB: 8.9 | | | | | | | | | |
| | | 1,4-BD [boiling point: 230° C., surface tension: 43.3 mN/m] | HLB: 7.6 | | | | | | | | | |
| | | DPDM [boiling point: 175° C., surface tension: 25.9 mN/m] | HLB: 0.0 | | | | | | | | | |
| | | DPMP [boiling point: 212° C., surface tension: 25.6 mN/m] | HLB: 1.9 | | | | | | | | | |
| | | BDG [boiling point: 230° C., surface tension: 27.9 mN/m] | HLB: 13.0 | | | | | | | | | |
| | | GLY [boiling point: 290° C., surface tension: 62.3 mN/m] | HLB: 11.1 | | | | | | | | | |

TABLE 7-continued

| | | | C1 | C2 | C3 | C4 | C5 | C6 | C7 | C8 | C9 | C10 |
|---|---|---|---|---|---|---|---|---|---|---|---|---|
| Surfactant (B) | Surfactant (B-1) | Acetylenediol 1 | HLB: 2.7 | 1% | | | | | | | | | |
| | | Acetylenediol 1 | HLB: 3.0 | | 1% | | | | | | | | |
| | | Surfynol 440 | HLB: 8.0 | | | 1% | | | | | | | |
| | other than surfactant (B-1) | Polyether-modified siloxane 1 | HLB: 7.6 | | | | 1% | | | | | | |
| | | Polyether-modified siloxane 2 | HLB: 4.6 | | | | | 1% | | | | | |
| | | Polyether-modified siloxane 3 | HLB: 7.5 | | | | | | 1% | | | | |
| | | Polyether-modified siloxane 4 | HLB: 1.9 | | | | | | | 1% | | | |
| | | Polyether-modified siloxane 5 | HLB: 9.2 | | | | | | | | 1% | | |
| | | Polyether-modified siloxane 6 | HLB: 1.2 | | | | | | | | | 1% | |
| | | Surfynol 465 | HLB: 13.0 | | | | | | | | | | 1% |
| Binder resin | | Water-soluble resin 1 (solid fraction = 40%) | | 10% | 10% | 10% | 10% | 10% | 10% | 10% | 10% | 10% | 10% |
| Water | | | | balance | balance | balance | balance | balance | balance | balance | balance | balance | balance |
| Evaluations | | Ink storage stability | | AA | AA | AA | AA | AA | AA | AA | AA | AA | AA |
| | | Ink dynamic surface tension | | A | A | A | A | A | A | A | A | A | A |
| | | Printed item spectral reflectance | | A | A | A | A | A | A | A | A | A | A |
| | | Printed item density irregularities | | A | A | A | A | A | A | A | A | A | A |
| | | Printed item voids | | A | A | A | A | A | A | A | A | A | A |
| | | Printed item gloss | | A | A | A | A | A | A | A | A | A | A |
| | | Printed item density | | AA | AA | AA | AA | AA | AA | AA | AA | AA | AA |
| | | Printed item drying properties | | AA | AA | AA | AA | AA | AA | AA | AA | AA | AA |
| | | Discharge stability | | AA | AA | AA | AA | AA | AA | AA | AA | AA | AA |

TABLE 8

| | | | | Example 92 (M92) | Example 93 (M93) | Example 94 (M94) | Example 95 (M95) | Example 96 (M96) | Example 97 (M97) | |
|---|---|---|---|---|---|---|---|---|---|---|
| Pigment dispersion | Magenta pigment dispersion (pigment concentration = 20%) | | type amount | MB52 18% | MB53 18% | MB54 18% | MB55 18% | MB56 18% | MB2 9% | MB16 9% |
| Water-soluble organic solvent (A) | Water-soluble organic solvent (A-1) | 1,2-BD [boiling point: 191° C., surface tension: 31.6 mN/m] | HLB: 7.6 | 20% | 20% | 20% | 20% | 20% | 20% | |
| | | 1,2-PenD [boiling point: 206° C., surface tension: 27.7 mN/m] | HLB: 6.5 | | | | | | | |
| | | 1,2-HexD [boiling point: 224° C., surface tension: 26.4 mN/m] | HLB: 5.8 | 5% | 5% | 5% | 5% | 5% | 5% | |
| | | DPM [boiling point: 190° C., surface tension: 28.6 mN/m] | HLB: 2.3 | | | | | | | |
| | | MB [boiling point: 157° C., surface tension: 29.3 mN/m] | HLB: 6.3 | | | | | | | |
| | | PGM [boiling point: 120° C., surface tension: 26.7 mN/m] | HLB: 3.8 | | | | | | | |
| | Solvent other than water-soluble organic solvent (A-1) | 1,2-PD [boiling point: 188° C., surface tension: 35.1 mN/m] | HLB: 8.9 | | | | | | | |
| | | 1,4-BD [boiling point: 230° C., surface tension: 43.3 mN/m] | HLB: 7.6 | | | | | | | |
| | | DPDM [boiling point: 175° C., surface tension: 25.9 mN/m] | HLB: 0.0 | | | | | | | |
| | | DPMP [boiling point: 212° C., surface tension: 25.6 mN/m] | HLB: 1.9 | | | | | | | |
| | | BDG [boiling point: 230° C., surface tension: 27.9 mN/m] | HLB: 13.0 | | | | | | | |
| | | GLY [boiling point: 290° C., surface tension: 62.3 mN/m] | HLB: 11.1 | | | | | | | |
| Surfactant (B) | Surfactant (B-1) | Acetylenediol 1 | HLB: 2.7 | | | | | | | |
| | | Acetylenediol 1 | HLB: 3.0 | 1% | 1% | 1% | 1% | 1% | 1% | |
| | | Surfynol 440 | HLB: 8.0 | | | | | | | |
| | | Polyether-modified siloxane 1 | HLB: 7.6 | | | | | | | |
| | | Polyether-modified siloxane 2 | HLB: 4.6 | 1% | 1% | 1% | 1% | 1% | 1% | |
| | | Polyether-modified siloxane 3 | HLB: 7.5 | | | | | | | |
| | | Polyether-modified siloxane 4 | HLB: 1.9 | | | | | | | |
| | other than surfactant (B-1) | Polyether-modified siloxane 5 | HLB: 9.2 | | | | | | | |
| | | Polyether-modified siloxane 6 | HLB: 1.2 | | | | | | | |
| | | Surfynol 465 | HLB: 13.0 | | | | | | | |
| Binder resin | Water-soluble resin 1 (solid fraction = 40%) | | | 10% | 10% | 10% | 10% | 10% | 10% | |
| Water | | | | balance | balance | balance | balance | balance | balance | |
| Evaluations | Ink storage stability | | | AA | AA | AA | AA | AA | A | |
| | Ink dynamic surface tension | | | A | A | A | A | A | A | |
| | Printed item spectral reflectance | | | A | A | A | A | A | A | |
| | Printed item density irregularities | | | A | A | A | A | A | A | |
| | Printed item voids | | | A | A | A | A | A | A | |
| | Printed item gloss | | | A | A | A | A | A | A | |
| | Printed item density | | | A | A | A | A | A | B | |
| | Printed item drying properties | | | AA | AA | AA | AA | AA | AA | |
| | Discharge stability | | | AA | AA | AA | AA | AA | AA | |

| | | | | Example 98 (M98) | Example 99 (M99) | Example 100 (M100) | Example 101 (M101) |
|---|---|---|---|---|---|---|---|
| Pigment dispersion | Magenta pigment dispersion (pigment concentration = 20%) | | type amount | MB57 20% | MB58 20% | MB59 20% | MB60 20% |
| Water-soluble organic solvent (A) | Water-soluble organic solvent (A-1) | 1,2-BD [boiling point: 191° C., surface tension: 31.6 mN/m] | HLB: 7.6 | 20% | 20% | 20% | 20% |
| | | 1,2-PenD [boiling point: 206° C., surface tension: 27.7 mN/m] | HLB: 6.5 | | | | |
| | | 1,2-HexD [boiling point: 224° C., surface tension: 26.4 mN/m] | HLB: 5.8 | 5% | 5% | 5% | 5% |
| | | DPM [boiling point: 190° C., surface tension: 28.6 mN/m] | HLB: 2.3 | | | | |
| | | MB [boiling point: 157° C., surface tension: 29.3 mN/m] | HLB: 6.3 | | | | |
| | | PGM [boiling point: 120° C., surface tension: 26.7 mN/m] | HLB: 3.8 | | | | |
| | Solvent other than water-soluble organic solvent (A-1) | 1,2-PD [boiling point: 188° C., surface tension: 35.1 mN/m] | HLB: 8.9 | | | | |
| | | 1,4-BD [boiling point: 230° C., surface tension: 43.3 mN/m] | HLB: 7.6 | | | | |
| | | DPDM [boiling point: 175° C., surface tension: 25.9 mN/m] | HLB: 0.0 | | | | |
| | | DPMP [boiling point: 212° C., surface tension: 25.6 mN/m] | HLB: 1.9 | | | | |

TABLE 8-continued

| | | | | | | | |
|---|---|---|---|---|---|---|---|
| | | BDG [boiling point: 230° C., surface tension: 27.9 mN/m] | HLB: 13.0 | | | | |
| | | GLY [boiling point: 290° C., surface tension: 62.3 mN/m] | HLB: 11.1 | | | | |
| Surfactant (B) | Surfactant (B-1) | Acetylenediol 1 | HLB: 2.7 | | | | |
| | | Acetylenediol 1 | HLB: 3.0 | | | | |
| | | Surfynol 440 | HLB: 8.0 | | | | |
| | | Polyether-modified siloxane 1 | HLB: 7.6 | | | | |
| | | Polyether-modified siloxane 2 | HLB: 4.6 | 1% | 1% | 1% | 1% |
| | | Polyether-modified siloxane 3 | HLB: 7.5 | | | | |
| | | Polyether-modified siloxane 4 | HLB: 1.9 | 1% | 1% | 1% | 1% |
| | other than surfactant (B-1) | Polyether-modified siloxane 5 | HLB: 9.2 | | | | |
| | | Polyether-modified siloxane 6 | HLB: 1.2 | | | | |
| | | Surfynol 465 | HLB: 13.0 | | | | |
| Binder resin | | Water-soluble resin 1 (solid fraction = 40%) | | 10% | 10% | 10% | 10% |
| Water | | | | balance | balance | balance | balance |
| Evaluations | | Ink storage stability | | A | A | A | B |
| | | Ink dynamic surface tension | | A | A | A | A |
| | | Printed item spectral reflectance | | A | A | A | A |
| | | Printed item density irregularities | | A | A | A | A |
| | | Printed item voids | | A | A | A | A |
| | | Printed item gloss | | A | A | A | B |
| | | Printed item density | | B | A | A | B |
| | | Printed item drying properties | | A | A | A | A |
| | | Discharge stability | | A | AA | AA | A |

<Production Examples for Magenta Inks (M102 to M114) of Comparative Examples 1 to 13>

Using the raw materials shown in Table 9, magenta inks (M102 to M114) of Comparative Examples 1 to 13 were produced in a similar manner to the production example for the magenta ink of Example 1.

TABLE 9

| | | | Comparative Example 1 (M102) | Comparative Example 2 (M103) | Comparative Example 3 (M104) | Comparative Example 4 (M105) | Comparative Example 5 (M106) | Comparative Example 6 (M107) | Comparative Example 7 (M108) |
|---|---|---|---|---|---|---|---|---|---|
| Pigment dispersion | Magenta pigment dispersion (pigment concentration = 20%) | type | MB2 | MB2 | MB2 | MB2 | MB2 | MB2 | MB15 |
| | | amount | 20% | 20% | 20% | 20% | 20% | 20% | 20% |
| Water-soluble organic solvent (A) | Water-soluble organic solvent (A-1) | 1,2-BD [boiling point: 191° C., surface tension: 31.6 mN/m] | HLB: 7.6 | 25% | 25% | 25% | 25% | 5% | | 20% |
| | | 1,2-PenD [boiling point: 206° C., surface tension: 27.7 mN/m] | HLB: 6.5 | | | | | | | |
| | | 1,2-HexD [boiling point: 224° C., surface tension: 26.4 mN/m] | HLB: 5.8 | | | | | 10% | | 5% |
| | | DPM [boiling point: 190° C., surface tension: 28.6 mN/m] | HLB: 2.3 | | | | | | | |
| | | MB [boiling point: 157° C., surface tension: 29.3 mN/m] | HLB: 6.3 | | | | | | | |
| | | PGM [boiling point: 120° C., surface tension: 26.7 mN/m] | HLB: 3.8 | | | | | | | |
| | Solvent other than water-soluble organic solvent (A-1) | 1,2-PD [boiling point: 188° C., surface tension: 35.1 mN/m] | HLB: 8.9 | | | | | | 30% | |
| | | 1,4-BD [boiling point: 230° C., surface tension: 43.3 mN/m] | HLB: 7.6 | | | | | | | |
| | | DPDM [boiling point: 175° C., surface tension: 25.9 mN/m] | HLB: 0.0 | | | | | | | |
| | | DPMP [boiling point: 212° C., surface tension: 25.6 mN/m] | HLB: 1.9 | | | | | | | |
| | | BDG [boiling point: 230° C., surface tension: 27.9 mN/m] | HLB: 13.0 | | | | | | 5% | |
| | | GLY [boiling point: 290° C., surface tension: 62.3 mN/m] | HLB: 11.1 | | | | | | | |
| Surfactant (B) | Surfactant (B-1) | Acetylenediol 1 | HLB: 2.7 | | | | | | | |
| | | Acetylenediol 1 | HLB: 3.0 | | | | | | | |
| | | Surfynol 440 | HLB: 8.0 | | | | | | | |
| | | Polyether-modified siloxane 1 | HLB: 7.6 | | | | | | | |
| | | Polyether-modified siloxane 2 | HLB: 4.6 | | | | | | | |
| | | Polyether-modified siloxane 3 | HLB: 7.5 | | | | | | | |
| | | Polyether-modified siloxane 4 | HLB: 1.9 | | | | | | | |
| | | Polyether-modified siloxane 5 | HLB: 9.2 | | | 1% | | | | |
| | other than surfactant (B-1) | Polyether-modified siloxane 6 | HLB: 1.2 | 1% | 1% | | | | 1% | 1% |
| | | Surfynol 465 | HLB: 13.0 | | | | | | | |

TABLE 9-continued

| | | | Comparative Example 8 (M109) | Comparative Example 9 (M110) | Comparative Example 10 (M111) | Comparative Example 11 (M112) | Comparative Example 12 (M113) | Comparative Example 13 (M114) |
|---|---|---|---|---|---|---|---|---|
| Binder resin | Water-soluble resin 1 (solid fraction = 40%) | | 10% | 10% | 10% | 10% | 10% | 10% |
| Water | | | balance | balance | balance | balance | balance | balance |
| Evaluations | Ink storage stability | | AA | C | AA | AA | AA | AA |
| | Ink dynamic surface tension | | B | B | B | B | B | B |
| | Printed item spectral reflectance | | A | A | A | A | A | A |
| | Printed item density irregularities | | C | B | C | C | D | B |
| | Printed item voids | | C | C | C | C | D | B |
| | Printed item gloss | | B | C | C | C | C | C |
| | Printed item density | | C | C | C | C | C | C |
| | Printed item drying properties | | AA | C | AA | A | C | AA |
| | Discharge stability | | AA | C | AA | A | AA | A |
| Pigment dispersion | Magenta pigment dispersion (pigment concentration = 20%) | type | MB2 | MB2 | MB2 | MB2 | MB2 | MB2 |
| | | amount | 20% | 20% | 20% | 20% | 4% | 55% |
| Water-soluble organic solvent (A) | Water-soluble organic solvent (A-1) | 1,2-BD [boiling point: 191° C., surface tension: 31.6 mN/m] | HLB: 7.6 | 25% | | | | | |
| | | 1,2-PenD [boiling point: 206° C., surface tension: 27.7 mN/m] | HLB: 6.5 | | | | | | |
| | | 1,2-HexD [boiling point: 224° C., surface tension: 26.4 mN/m] | HLB: 5.8 | | | | | | |
| | | DPM [boiling point: 190° C., surface tension: 28.6 mN/m] | HLB: 2.3 | | 25% | | | | |
| | | MB [boiling point: 157° C., surface tension: 29.3 mN/m] | HLB: 6.3 | | | | | | |
| | | PGM [boiling point: 120° C., surface tension: 26.7 mN/m] | HLB: 3.8 | | | | | | |
| | | 1,2-PD [boiling point: 188° C., surface tension: 35.1 mN/m] | HLB: 8.9 | | | | | | |
| | | 1,4-BD [boiling point: 230° C., surface tension: 43.3 mN/m] | HLB: 7.6 | | | | 5% | 15% | 15% |
| | | DPDM [boiling point: 175° C., surface tension: 25.9 mN/m] | HLB: 0.0 | | | | | | |
| | | DPMP [boiling point: 212° C., surface tension: 25.6 mN/m] | HLB: 1.9 | | | 25% | | | |
| | | BDG [boiling point: 230° C., surface tension: 27.9 mN/m] | HLB: 13.0 | | | | | | |
| | Solvent other than water-soluble organic solvent (A-1) | GLY [boiling point: 290° C., surface tension: 62.3 mN/m] | HLB: 11.1 | | | | 50% | 15% | 15% |

TABLE 9-continued

| | | | | | | | | |
|---|---|---|---|---|---|---|---|---|
| Surfactant (B) | Surfactant (B-1) | Acetylenediol 1 | HLB: 2.7 | | | | | |
| | | Acetylenediol 1 | HLB: 3.0 | | | | | |
| | | Surfynol 440 | HLB: 8.0 | | | | | |
| | | Polyether-modified siloxane 1 | HLB: 7.6 | | | | | |
| | | Polyether-modified siloxane 2 | HLB: 4.6 | | | | | | 1% |
| | | Polyether-modified siloxane 3 | HLB: 7.5 | | | | 1% | |
| | | Polyether-modified siloxane 4 | HLB: 1.9 | | | 1% | | |
| | | Polyether-modified siloxane 5 | HLB: 9.2 | | 1% | | | |
| | | Polyether-modified siloxane 6 | HLB: 1.2 | 1% | | | | |
| | other than surfactant (B-1) | Surfynol 465 | HLB: 13.0 | 1% | | | | | |
| Binder resin | | Water-soluble resin 1 (solid fraction = 40%) | | 10% | 10% | 10% | 10% | 10% | 10% |
| Water | | | | balance | balance | balance | balance | balance | balance |
| Evaluations | | Ink storage stability | | AA | C | C | C | A | C |
| | | Ink dynamic surface tension | | B | A | A | A | A | A |
| | | Printed item spectral reflectance | | A | B | B | A | B | A |
| | | Printed item density irregularities | | C | B | B | C | C | A |
| | | Printed item voids | | C | D | D | C | A | A |
| | | Printed item gloss | | C | C | C | C | A | A |
| | | Printed item density | | C | C | C | C | C | AA |
| | | Printed item drying properties | | C | A | A | A | AA | A |
| | | Discharge stability | | AA | D | D | C | A | C |

The abbreviations used in Tables 3 to 9 have the following meanings.

1,2-BD: 1,2-butanediol (boiling point: 191° C., surface tension: 31.6 mN/m, HLB value: 7.6)

1,2-PenD: 1,2-pentanediol (boiling point: 206° C., surface tension: 27.7 mN/m, HLB value: 6.5)

1,2-HexD: 1,2-hexanediol (boiling point: 224° C., surface tension: 26.4 mN/m, HLB value: 5.8)

DPM: dipropylene glycol monomethyl ether (boiling point: 189.6° C., surface tension: 28.6 mN/m, HLB value: 2.3)

MB: 3-methoxy-1-butanol (boiling point: 157° C., surface tension: 29.3 mN/m, HLB value: 6.3)

PGM: propylene glycol monomethyl ether (boiling point: 120° C., surface tension: 26.7 mN/m, HLB value: 3.8)

1,2-PD: 1,2-propanediol (boiling point: 188.2° C., surface tension: 35.1 mN/m, HLB value: 8.9)

1,4-BD: 1,4-butanediol (boiling point: 230° C., surface tension: 43.3 mN/m, HLB value: 7.6)

DPDM: dipropylene glycol dimethyl ether (boiling point: 175° C., surface tension: 25.9 mN/m, HLB value: 0.0)

DPMP: dipropylene glycol monopropyl ether (boiling point: 212° C., surface tension: 25.6 mN/m, HLB value: 1.9)

BDG: diethylene glycol monobutyl ether (boiling point: 230° C., surface tension: 27.9 mN/m, HLB value: 13.0)

GLY: glycerol (boiling point: 290° C., surface tension: 62.3 mN/m, HLB value: 11.1)

<Production of Yellow Ink 1 (Y1)>

A mixture was prepared containing 20 parts of the yellow pigment dispersion 1, 25 parts of 1,2-butanediol, 10 parts of the binder resin 1, 1 part of the polyether-modified siloxane 3, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a yellow ink 1 (Y1). The dynamic surface tension of the produced ink at 10 milliseconds, calculated using the maximum bubble pressure method, was 35 to 45 mN/m.

<Production of Yellow Ink 2 (Y2)>

A mixture was prepared containing 20 parts of the yellow pigment dispersion 1, 20 parts of 1,2-butanediol, 5 parts of 1,2-hexanediol, 10 parts of the binder resin 1, 1 part of the acetylenediol 2, 1 part of the polyether-modified siloxane 2, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a yellow ink 2 (Y2). The dynamic surface tension of the produced ink at 10 milliseconds, calculated using the maximum bubble pressure method, was 25 to 35 mN/m.

<Production of Yellow Inks 3 and 4 (Y3 and Y4)>

A mixture was prepared containing 20 parts of the yellow pigment dispersion 2, 20 parts of 1,2-butanediol, 5 parts of 1,2-hexanediol, 10 parts of the binder resin 1, 1 part of the acetylenediol 2, 1 part of the polyether-modified siloxane 2, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a yellow ink 3 (Y3). Further, with the exception of replacing the yellow pigment dispersion 2 with the yellow pigment dispersion 3, a yellow ink 4 (Y4) was produced in the same manner as the above yellow ink 3. The dynamic surface tension values of the produced yellow inks 3 and 4 at 10 milliseconds, calculated using the maximum bubble pressure method, were both 25 to 35 mN/m.

<Production of Yellow Inks 5 and 6 (Y5 and Y6)>

A mixture was prepared containing 20 parts of the yellow pigment dispersion 2, 20 parts of 1,2-butanediol, 5 parts of 1,2-hexanediol, 5 parts of 3-methoxy-1-butanol, 10 parts of the binder resin 1, 1 part of the acetylenediol 2, 1 part of the polyether-modified siloxane 2, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a yellow ink 5 (Y5). Further, with the exception of replacing the 3-methoxy-1-butanol with propylene glycol monomethyl ether, a yellow ink 6 (Y6) was produced in the same manner as the above yellow ink 5. The dynamic surface tension values of the produced yellow inks 5 and 6 at 10 milliseconds, calculated using the maximum bubble pressure method, were both 25 to 35 mN/m.

<Production of Cyan Ink 1 (C1)>

A mixture was prepared containing 15 parts of the cyan pigment dispersion 1, 25 parts of 1,2-butanediol, 10 parts of the binder resin 1, 1 part of the polyether-modified siloxane 3, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a cyan ink 1 (C1). The dynamic surface tension of the produced ink at 10 milliseconds, calculated using the maximum bubble pressure method, was 35 to 45 mN/m.

<Production of Cyan Ink 2 (C2)>

A mixture was prepared containing 15 parts of the cyan pigment dispersion 1, 20 parts of 1,2-butanediol, 5 parts of 1,2-hexanediol, 10 parts of the binder resin 1, 1 part of the acetylenediol 2, 1 part of the polyether-modified siloxane 2, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a cyan ink 2 (C2). The dynamic surface tension of the produced ink at 10 milliseconds, calculated using the maximum bubble pressure method, was 25 to 35 mN/m.

<Production of Cyan Inks 3 and 4 (C3 and C4)>

A mixture was prepared containing 15 parts of the cyan pigment dispersion 1, 20 parts of 1,2-butanediol, 5 parts of 1,2-hexanediol, 5 parts of 3-methoxy-1-butanol, 10 parts of the binder resin 1, 1 part of the acetylenediol 2, 1 part of the polyether-modified siloxane 2, and the balance in water to make the total amount of the ink up to 100 parts, and this mixture was stirred thoroughly using a Disper until uniform. Subsequently, the mixture was filtered through a membrane filter to remove the types of coarse particles that can cause head blockages, thus completing production of a cyan ink 3 (C3). Further, with the exception of replacing the 3-methoxy-1-butanol with propylene glycol monomethyl ether, a cyan ink 4 (C4) was produced in the same manner as the above cyan ink 3. The dynamic surface tension values of the produced cyan inks 3 and 4 at 10 milliseconds, calculated using the maximum bubble pressure method, were both 25 to 35 mN/m.

<Evaluations of Inkjet Inks>

The magenta inks (M1 to M101) produced in Examples 1 to 101 were subjected to the evaluations described below. The evaluation results that were obtained are shown in Tables 3 to 8, 10 and 11. Further, the magenta inks (M102 to M114) produced in Comparative Examples 1 to 13 were also subjected to the following evaluations. The obtained results are shown in Tables 9 and 11.

104.7 g/m$^2$), and drying was then performed for 3 minutes in a 60° C. air oven to produce a coated product. Subsequently, the spectral reflectance of the thus produced coated product was evaluated using an i1 Pro2 device manufactured by X-Rite Inc., by performing measurements at 10 nm intervals within the wavelength region from 480 to 580 nm. The meanings of the symbols recorded in Tables 3 and 4 are as follows.

TABLE 10

|  |  | Example 102 | Example 103 | Example 104 | Example 105 | Example 106 | Example 107 | Example 108 | Example 109 |
|---|---|---|---|---|---|---|---|---|---|
| Ink combination | Magenta ink | M7 | M19 | M19 | M19 | M31 | M32 | M48 | M49 |
|  | Cyan ink | C1 | C2 | C2 | C2 | C3 | C4 | C2 | C2 |
|  | Yellow ink | Y1 | Y2 | Y3 | Y4 | Y5 | Y6 | Y3 | Y3 |
| Evaluations | Mixed color bleeding | OK Topcoat + | B | A | AA | A | AA | AA | AA | AA |
|  |  | FOR #20 | A | A | A | A | AA | AA | A | A |
|  | Hue | OK Topcoat + | B | A | AA | A | AA | AA | B | A |
|  |  | FOR #20 | B | A | A | A | AA | AA | B | A |

TABLE 11

|  |  | Example 110 | Example 111 | Example 112 | Example 113 | Example 114 | Example 115 | Comparative Example 14 | Comparative Example 15 |
|---|---|---|---|---|---|---|---|---|---|
| Ink combination | Magenta ink | M50 | M51 | M52 | M53 | M54 | M55 | M108 | M105 |
|  | Cyan ink | C2 | C2 | C2 | C2 | C2 | C2 | C2 | C2 |
|  | Yellow ink | Y3 | Y3 | Y3 | Y3 | Y3 | Y3 | Y3 | Y3 |
| Evaluations | Mixed color bleeding | OK Topcoat + | AA | AA | AA | AA | AA | AA | A | C |
|  |  | FOR #20 | A | A | A | A | A | A | A | C |
|  | Hue | OK Topcoat + | B | B | B | B | B | B | C | A |
|  |  | FOR #20 | B | B | B | B | B | B | C | A |

<Evaluation of Ink Storage Stability>

The viscosity of each of the magenta inks M1 to M114 was measured using an E-type viscometer (TVE-20L, manufactured by Toki Sangyo Co., Ltd.), under conditions including a temperature of 25° C. and a rotational rate of 50 rpm. The ink was then stored in a thermostatic chamber at 70° C. and subjected to accelerated aging, and the change in the ink viscosity over the storage period was evaluated. The evaluation criteria were as follows, with evaluations of AA, A and B representing the practically usable range.

AA: the change in viscosity after storage for 4 weeks was less than ±5%

A: the change in viscosity after storage for 2 weeks was less than ±5%

B: the change in viscosity after storage for 1 week was less than ±5%

C: the change in viscosity after storage for 1 week was at least ±5%

<Evaluation of Ink Dynamic Surface Tension>

The dynamic surface tension of each magenta ink at 10 milliseconds was evaluated using a bubble pressure dynamic surface tension meter BP 100 (manufactured by Kruss GmbH) using the maximum bubble pressure method. The meanings of the symbols recorded in Tables 3 to 9 are as follows.

A: dynamic surface tension of 25 to 35 mN/m
B: dynamic surface tension of 35 to 45 mN/m <Evaluation of Spectral Reflectance of Coated Product>

Using a K Control Coater K202 manufactured by Matsuo Sangyo Co., Ltd. and a wire bar No. 1, each of the magenta inks M1 to M114 was coated onto a sheet of OK Topcoat+ paper manufactured by Oji Paper Co., Ltd. (basis weight:

A: the spectral reflectance was not more than 10% across the entire wavelength region from 480 to 580 nm.

B: the spectral reflectance exceeded 10% at one or more locations in the wavelength region from 480 to 580 nm.

<Evaluation of Printed Item Density Irregularities>

Using an inkjet discharge apparatus fitted with a head (QA06NTB) manufactured by Kyocera Corporation, solid printing at coverage rates of 60%, 80% and 100% was performed by discharging the ink onto OK Topcoat+paper manufactured by Oji Paper Co., Ltd. (basis weight: 104.7 g/m$^2$) under printing conditions including a frequency of 20 kHz and a resolution of 600×600 dpi. Following printing, drying was performed for 3 minutes in a 60° C. air oven, and the level of density irregularities on the printed item was inspected under a magnifying glass. The evaluation criteria were as follows, with evaluations of AA, A and B representing the practically usable range.

AA: no density irregularities occurred at any of the coverage rates.

A: no density irregularities occurred at coverage rates of 80% or less, but slight density irregularities were visible at a coverage rate of 100%.

B: no density irregularities occurred at coverage rates of 60% or less, but slight density irregularities occurred at coverage rates of 80% to 100%.

C: slight density irregularities occurred at a coverage rate of 60%, and obvious density irregularities occurred at coverage rates of 80% to 100%.

D: obvious density irregularities occurred at a coverage rate of 60%.

<Evaluation of Printed Item Voids>

The degree of voids in the solid printed item having a coverage rate of 100% produced in the above evaluation of density irregularities was inspected under a magnifying glass and with the naked eye. The evaluation criteria were as follows, with evaluations of A and B representing the practically usable range.

A: no voids were visible under the magnifying glass or with the naked eye.

B: slight voids were visible under the magnifying glass, but no voids were visible with the naked eye.

C: voids were clearly visible with the naked eye.

<Evaluation of Printed Item Gloss>

The 60° gloss of the solid printed item having a coverage rate of 100% produced in the above evaluation of density irregularities was measured and evaluated using a Micro Tri-Gloss gloss meter (manufactured by BYK-Chemie Japan K.K.). The evaluation criteria were as follows, with evaluations of AA, A and B representing the practically usable range.

AA: the gloss value was 55 or greater, and the gloss uniformity of the printed item surface was excellent.

A: the gloss value was at least 45 but less than 55, and the gloss uniformity of the printed item surface was excellent.

B: the gloss value was at least 45 but less than 55, but the gloss of the printed item surface was slightly non-uniform.

C: the gloss value was at least 35 but less than 45, and the gloss uniformity of the printed item surface was poor.

D: the gloss value was at least 25 but less than 35, and the gloss uniformity of the printed item surface was extremely poor.

<Evaluation of Printed Item Density>

The solid printed item having a coverage rate of 100% produced in the above evaluation of density irregularities was measured for optical density (OD value) using a spectral densitometer (manufactured by X-Rite Inc.). The evaluation criteria were as follows, with evaluations of AA, A and B representing the practically usable range.

AA: OD value of 1.6 or greater

A: OD value of at least 1.5 but less than 1.6

B: OD value of at least 1.4 but less than 1.5

C: OD value of less than 1.4

<Evaluation of Printed Item Drying Properties>

Solid printing was performed at a coverage rate of 100% using the same printing conditions and printing substrate as the evaluations described above. Following printing, the printed item was placed in a 60° C. air oven, and the drying properties of the printed item were evaluated by touching the printed item with a finger every 10 seconds. The evaluation criteria were as follows, with evaluations of AA, A and B representing the practically usable range.

AA: even when the printed item was touched with a finger after 10 seconds in the oven, no ink adhered to the finger.

A: ink adhered to the finger after 10 seconds in the oven, but no ink adhered after 20 seconds.

B: ink adhered to the finger after 20 seconds in the oven, but no ink adhered after 30 seconds.

C: ink adhered to the finger even after 30 seconds in the oven.

<Evaluation of Discharge Stability>

The magenta inks M1 to M114 were each loaded into an inkjet discharge apparatus fitted with a head (QA06NTB) manufactured by Kyocera Corporation. Following confirmation of no nozzle misfires, the inkjet discharge apparatus was placed in standby mode in an environment at 25° C. for a specified time. Following the specified time, a nozzle check pattern was printed, and the number of nozzle misfires was evaluated visually. The evaluation criteria were as follows, with evaluations of AA, A and B representing the practically usable range.

AA: even when printing was performed after 6 hours of standby, there were absolutely no nozzle misfires.

A: when printing was performed after 4 hours of standby, there were absolutely no nozzle misfires, but when printing was performed after 6 hours of standby, at least one nozzle misfire occurred.

B: when printing was performed after 2 hours of standby, there were absolutely no nozzle misfires, but when printing was performed after 4 hours of standby, at least one nozzle misfire occurred.

C: when printing was performed after 1 hour of standby, 1 to 9 nozzle misfires occurred.

D: when printing was performed after 1 hour of standby, 10 or more nozzle misfires occurred.

<Evaluation of Inkjet Ink Set Mixed Color Bleeding>

The combinations of inks recorded in Tables 10 and 11 were each loaded as an ink set into an inkjet discharge apparatus fitted with a head (QA06NTB) manufactured by Kyocera Corporation. A color chart image (composed of an array of patches containing the three colors of cyan, magenta and yellow combined in increments of 10% respectively) was printed by discharging the inks onto a low-absorption substrate under printing conditions including a frequency of 30 kHz and a resolution of 600×600 dpi. Following printing, drying was performed for 3 minutes in a 60° C. air oven, and the level of mixed color bleeding in the printed item was evaluated by inspection under a magnifying glass and with the naked eye. The evaluation criteria were as follows, with evaluations of AA, A and B representing the practically usable range. For the low-absorption substrate, OK Topcoat+paper manufactured by Oji Paper Co., Ltd. (basis weight: 104.7 g/m$^2$) and FOR #20 (a biaxially stretched polypropylene film, thickness: 20 μm) manufactured by Futamura Chemical Co., Ltd. were used.

AA: no mixed color bleeding was visible under the magnifying glass or with the naked eye.

A: slight mixed color bleeding was visible under the magnifying glass, but no mixed color bleeding was visible with the naked eye.

B: slight mixed color bleeding was visible with the naked eye.

C: obvious mixed color bleeding was visible with the naked eye.

<Evaluation of Inkjet Ink Set Hue>

The hue of printed items produced by the printing method described above using the combinations of inks recorded in Tables 10 and 11 as ink sets were evaluated by performing color measurements using a spectral colorimeter (manufactured by X-Rite Inc.). The evaluations were performed by comparison with the color reproduction range for sheet printing specified by Japan Color 2011. The evaluation criteria were as follows, with evaluations of AA, A and B representing the practically usable range.

AA: color reproduction range equal to or better than the Japan Color range.

A: color reproduction range similar to the Japan Color range.

B: color reproduction range that does not quite satisfy the Japan Color range.

C: color reproduction range much narrower than the Japan Color range.

Based on the above, it was evident that the magenta ink for inkjet according to the present invention yielded distinct images having high gloss and no density irregularities or voids upon inkjet printing onto low-absorption substrates, exhibited excellent discharge stability after long standby periods, and was able to provide excellent drying properties even during high-speed printing. Further, it was also evident that an ink set containing the magenta ink for inkjet of the present invention was able to suppress mixed color bleeding and provide superior color reproducibility on low-absorption substrates.

The invention claimed is:

1. A magenta ink for inkjet comprising at least a pigment, a water-soluble organic solvent (A), a surfactant (B) and water, wherein
the pigment comprises at least one azo pigment in an amount of 1 to 10% by weight relative to a total weight of the magenta ink for inkjet,
the water-soluble organic solvent (A) comprises a water-soluble organic solvent (A-1) having a static surface tension at 25° C. of 22 to 32 mN/m and an HLB value of 2.0 to 8.0 and having at least one hydroxyl group in an amount of 5 to 50% by weight relative to a total weight of the magenta ink for inkjet, and
the surfactant (B) comprises a surfactant (B-1) having an HLB value of 1.5 to 8.0.

2. The magenta ink for inkjet according to claim 1, wherein a spectral reflectance of a coated product having a wet film thickness of 6 μm formed on a recording medium is not more than 10% in a wavelength region from 480 to 580 nm.

3. The magenta ink for inkjet according to claim 1, wherein the azo pigment is at least one pigment selected from among C.I. Pigment Red 31, 146, 147, 150, 266 and 269.

4. The magenta ink for inkjet according to claim 1, wherein the water-soluble organic solvent (A-1) comprises at least one compound having a boiling point at one atmosphere of 190 to 250° C.

5. The magenta ink for inkjet according to claim 4, wherein the compound having a boiling point at one atmosphere of 190 to 250° C. is an alkanediol of 4 to 6 carbon atoms.

6. The magenta ink for inkjet according to claim 1, wherein the water-soluble organic solvent (A-1) comprises at least one glycol alkyl ether having a boiling point at one atmosphere of 100 to 250° C.

7. The magenta ink for inkjet according to claim 1, wherein a dynamic surface tension at 10 milliseconds, calculated using a maximum bubble pressure method, is from 25 to 35 mN/m.

8. The magenta ink for inkjet according to claim 1, further comprising, as a pigment dispersing resin, a (meth)acrylic-based copolymer having a weight average molecular weight of 15,000 to 50,000 that includes at least a monomer containing an aromatic ring within a copolymerization composition.

9. The magenta ink for inkjet according to claim 1, comprising at least one polyether-modified polydimethylsiloxane as the surfactant (B-1).

10. The magenta ink for inkjet according to claim 9, wherein the polyether-modified polydimethylsiloxane has a polyether group on a side chain of a polydimethylsiloxane chain.

11. An inkjet ink set comprising at least a cyan ink, a yellow ink and a magenta ink, wherein
the cyan ink and the yellow ink contain at least one of the surfactant (B-1), and
the magenta ink is the magenta ink for inkjet according to claim 1.

12. A method for producing an inkjet printed item, the method comprising the ink set according to claim 11 onto a low-absorption substrate.

13. A method for producing an inkjet printed item, the method comprising printing the magenta ink for inkjet according to claim 1 onto a low-absorption substrate.

* * * * *